United States Patent [19]
Fukui et al.

[11] Patent Number: 5,802,295
[45] Date of Patent: Sep. 1, 1998

[54] INFORMATION PROCESSING METHOD AND SYSTEM THEREFOR

[75] Inventors: Toshiyuki Fukui, Kawasaki; Kazumasa Hamaguchi, Yokohama; Masato Kosugi, Yokohama; Tomohiko Shimoyama, Yokohama, all of Japan

[73] Assignee: Canon Kabushiki Kaisha, Tokyo, Japan

[21] Appl. No.: 525,196

[22] Filed: Sep. 8, 1995

[30] Foreign Application Priority Data

Sep. 12, 1994 [JP] Japan .................................. 6-217053
Sep. 12, 1994 [JP] Japan .................................. 6-217054
Sep. 12, 1994 [JP] Japan .................................. 6-217159

[51] Int. Cl.$^6$ .................................................. H01J 13/00
[52] U.S. Cl. .......................... 395/200.46; 395/200.42; 395/200.43; 395/200.44; 395/200.78
[58] Field of Search ..................... 395/200.19, 200.13, 395/200.2, 800, 293, 881, 311, 200.06, 200.07, 200.08, 600, 438, 444, 474, 477, 479, 480, 490, 200.78, 200.42–200.46; 370/85, 16, 60.1, 85.2

[56] References Cited

U.S. PATENT DOCUMENTS

| | | | |
|---|---|---|---|
| 4,896,256 | 1/1990 | Roberts | 395/200.19 |
| 5,202,980 | 4/1993 | Morita et al. | 395/575 |
| 5,361,366 | 11/1994 | Kawano et al. | 395/800 |
| 5,506,964 | 4/1996 | Beukema | 395/200.09 |
| 5,548,728 | 8/1996 | Danknick | 395/200.14 |
| 5,561,797 | 10/1996 | Gilles et al. | 395/600 |
| 5,577,229 | 11/1996 | Wakerly | 395/474 |
| 5,596,754 | 1/1997 | Lomet | 395/726 |
| 5,602,663 | 2/1997 | Hamaguchi et al. | 395/125 |
| 5,625,795 | 4/1997 | Sakakura et al. | 395/475 |
| 5,649,106 | 7/1997 | Tsujimichi et al. | 395/200.08 |

*Primary Examiner*—Ayaz R. Sheikh
*Assistant Examiner*—Raymond N. Phan
*Attorney, Agent, or Firm*—Fitzpatrick, Cella, Harper & Scinto

[57] ABSTRACT

An information processing method and a system therefor are capable of performing a synchronized operation among CPUs over nodes that cannot monitor each other's internal buses. The system has a plurality of nodes each including one or more CPUs that use monitoring of a common internal bus as a mechanism for synchronizing the CPUs, wherein the plurality of nodes are connected to one another by a connection path that cannot monitor information in a bus in each node. The information processing system includes a transmitter for transmitting information required to perform a synchronized operation in the node or among the nodes through the connection path, and a reflector for reflecting a portion or the overall body of information to the node in accordance with information transmitted by the transmitter so that synchronization of operations of the CPUs over the nodes is realized.

8 Claims, 36 Drawing Sheets

FIG. 1
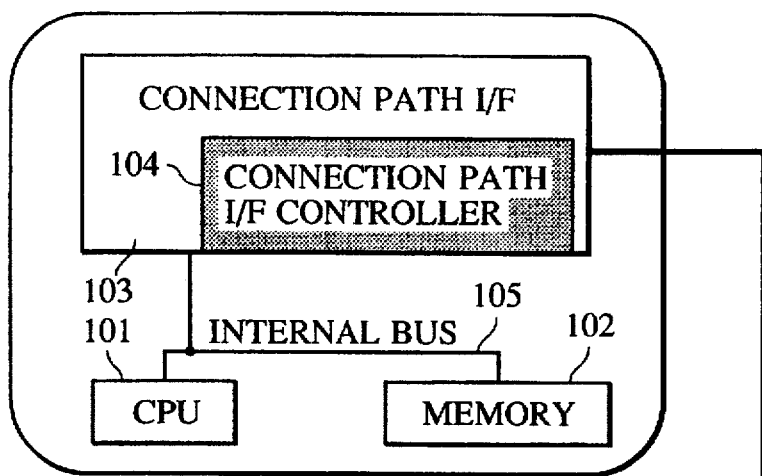
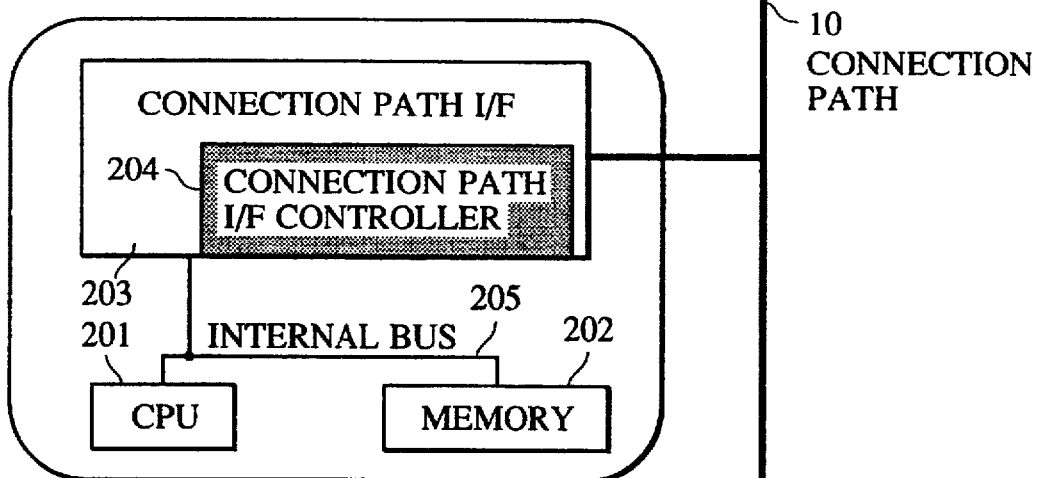
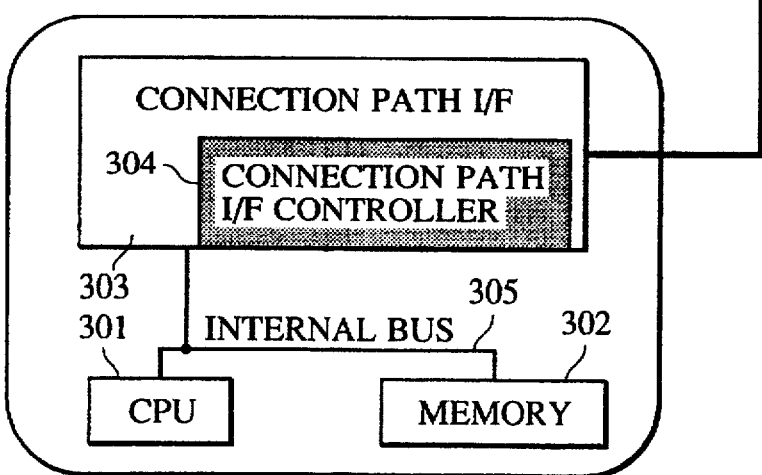

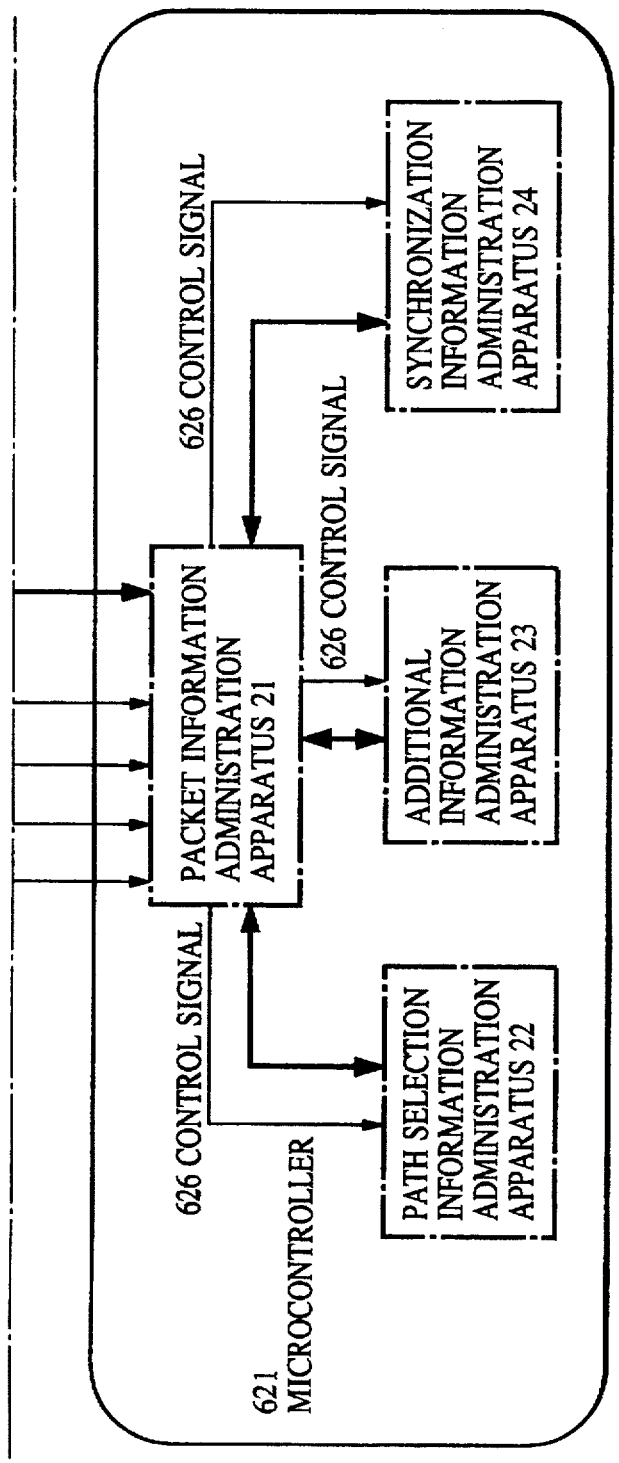

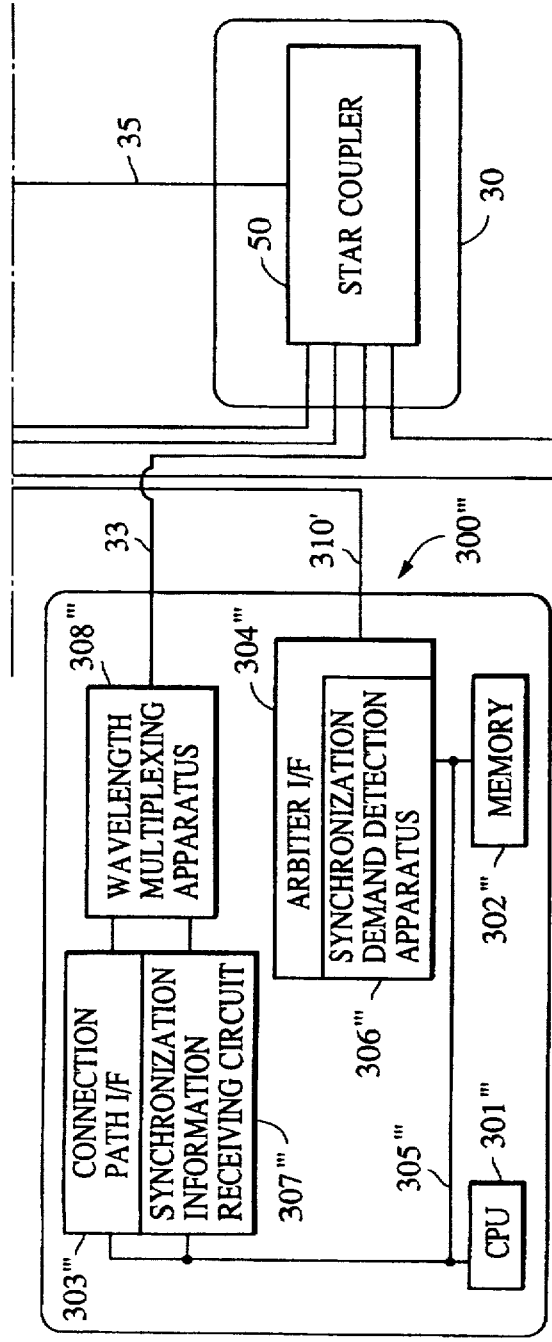
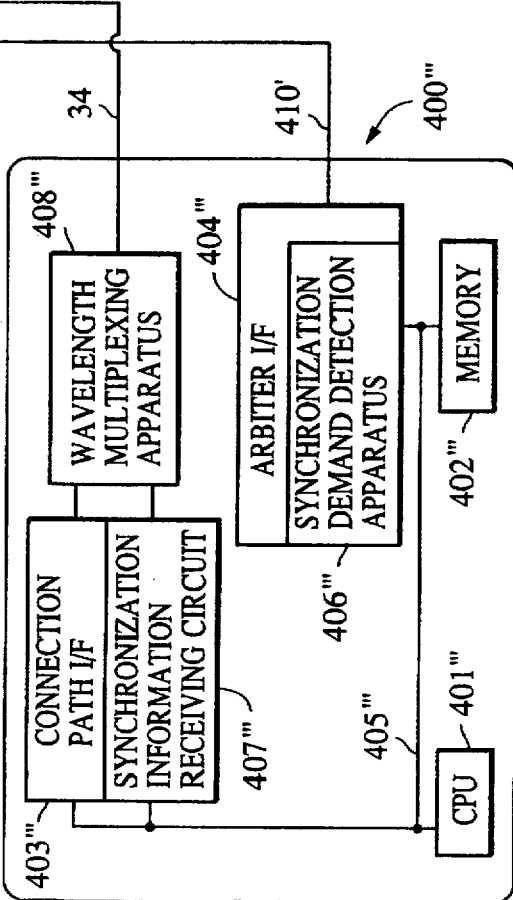
FIG. 23B
FIG. 23
FIG. 23A
FIG. 23B

| FIG. 24A |
| FIG. 24B |

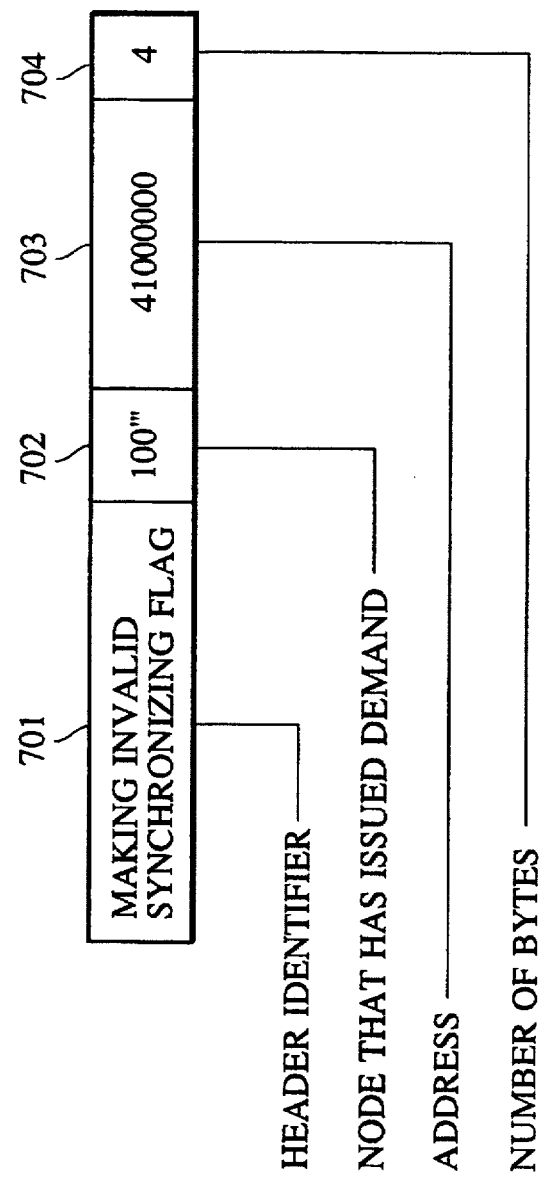

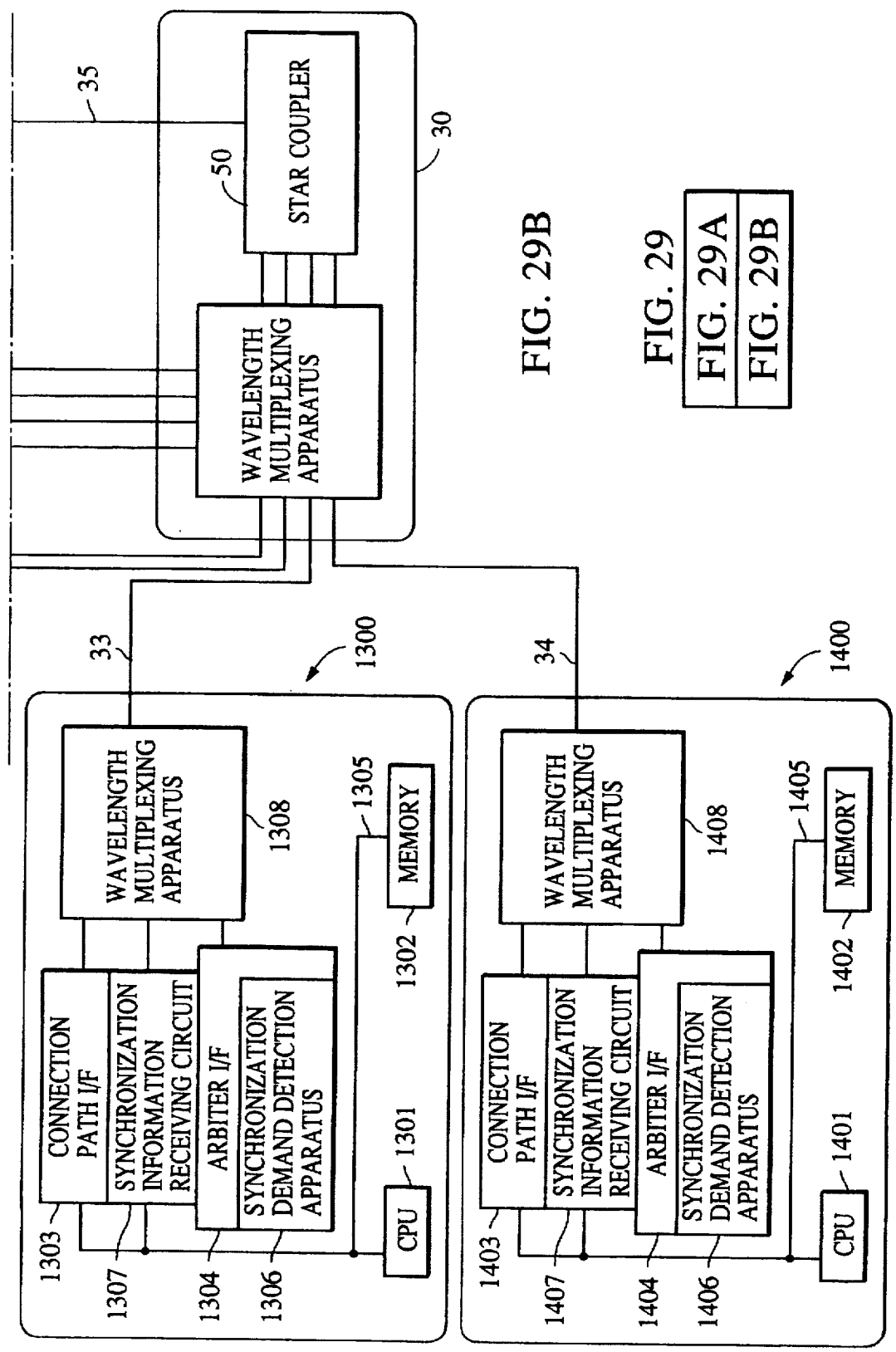

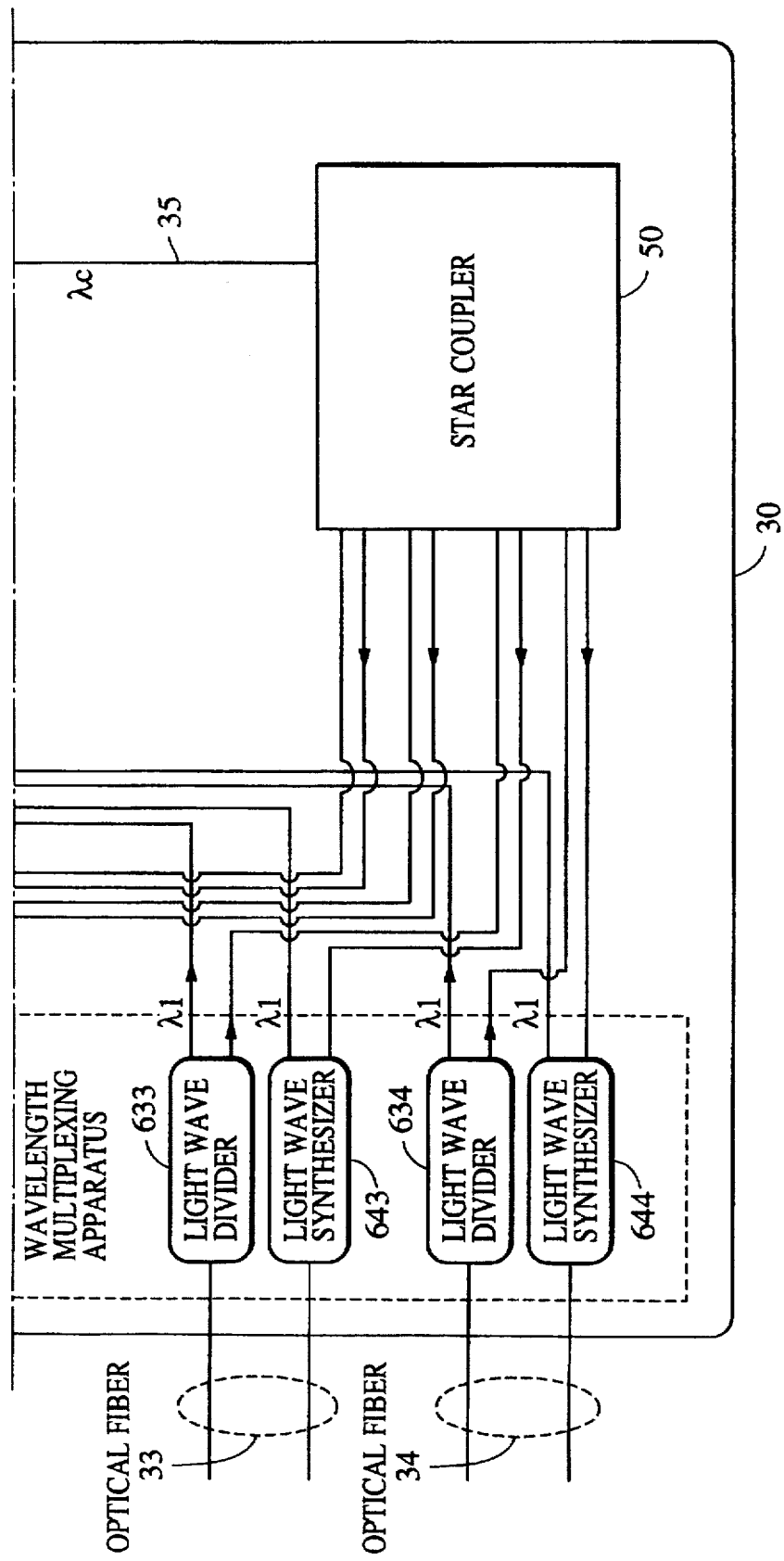

INFORMATION PROCESSING METHOD AND SYSTEM THEREFOR

BACKGROUND OF THE INVENTION

1. Field of the Invention

The present invention relates to an information processing method operative in a system having a plurality of nodes, each node having one or more central processing units (CPUs) and memories connected to one another, and to an apparatus therefor.

2. Related Background Art

In a multiprocessor system comprising a plurality of CPUs operating in parallel, the CPUs have been synchronized with one another by either of the following two methods. One method uses a common bus, to which the plurality of CPUs are connected, which is solely occupied by one CPU at any given moment. The other method uses three elements: a first command (hereinafter referred as a "Load Reserve [LR] command") for setting a reserve flag in accordance with a load command, a second command (hereinafter referred as a "Store Conditional [SC] command"), which is one of several conditional storing commands and which first causes the reserve flag to be checked prior to performing the storing command, then causes the storing command to be performed if the flag is valid, and finally makes the reserve flag invalid; and a function (hereinafter referred as a "Store Survey[SS] function") of monitoring the bus to make invalid the reserve flag if a detection is made that another CPU has performed the storing command with respect to the same address in which the subject CPU has performed the [LR] command. In the second method, the [LR] command, [SC] command and the [SS] function are used to synchronize the CPUs of the multiprocessor system.

The foregoing method that uses the [LR] command, [SC] command and the [SS] function is intended to improve the performance of the multiprocessor system so that the bus is not so occupied as compared with the former method.

In the case where a plurality of nodes each having one or more processors and memories are connected to one another in order to exchange data among the nodes, a typical method uses a LAN exemplified by the IEEE 802.3 and 802.4 standards to establish the connections. Another system has been suggested in which the processors perform coordinated operations during the foregoing data exchange to improve the total computing performance of the system.

However, in the system employing the LAN, a signal on the bus in one node cannot be monitored from another node. Therefore, control of synchronization of the CPUs in different nodes by using the [LR] command, [SC] command and the [SS] function cannot be employed, and synchronization of a plurality of CPUs can be performed only among the CPUs in one node thus a complicated process using synchronization of CPUs in different nodes cannot be performed.

In view of the foregoing, an object of the present invention is to provide an information processing method and a system therefor that is capable of controlling synchronization among nodes that have previously been impossible to monitor over a common bus.

Another object of the present invention is to provide an information processing method and a system therefor that is capable of controlling synchronization among CPUs in different nodes that cannot be monitored over a common bus.

Also, in the case where a plurality of nodes, each having one or more processors and memories, are connected to one another in order to exchange data among the nodes, there have been employed a both method in which the connection is established by using a software protocol and a method in which a software protocol is not employed, but each address space of CPUs in the nodes is connected directly with a hardware. The latter method is exemplified by an information processing apparatus adapted to a light wavelength multiplexing method that was disclosed by the present applicant in U.S. Appln. Ser. No. 08/341,876. The foregoing method is characterized in that a plurality of wavelengths are used to realize simultaneous data transference among a plurality of nodes.

A modification of the foregoing system has been disclosed by the present applicant in U.S. Pat. No. 5,602,663 in which each node transmits, to an arbiter, additional information relating to data transference simultaneously with issuing a demand for a connection path prior to performing the data transferences. The arbiter transmits, to the connected node, this information through an arbitration signal line when the connection path is set, and the node that has received the connection demand in an overlap manner sets up the path and prepares data to be transmitted/received among the nodes so as to improve the efficiency in transferring data after the connection path has been set.

However, since this system employing the light wavelength multiplexing method uses a plurality of wavelengths to realize simultaneous and different data transference among a plurality of nodes, each CPU in the node cannot simultaneously monitor the plurality of data transference operations. Therefore, the foregoing system cannot employ a mechanism for synchronizing CPUs in different nodes. Thus, synchronization of CPUs can be realized only within one node, and again a complicated process using synchronization of CPUs in different nodes cannot be performed.

Accordingly, another object of the present invention is to realize synchronization of CPUs in different nodes.

SUMMARY OF THE INVENTION

According to one aspect of the present invention, there is provided an information processing system having a plurality of nodes each including one or more CPUs that monitor a common bus as a mechanism for synchronizing the CPUs, wherein the plurality of nodes are connected to one another by a connection path over which one node cannot monitor information in a bus in another node, each node of the information processing system comprising:

transmission means for transmitting information required to perform a synchronized operation in the node or among other nodes through the connection path; and means for reflecting at least a portion or all of information to the node thereof in accordance with information transmitted by the transmission means, so that synchronization of operations of the CPUs in different nodes is realized.

Other and further objects, features and advantages of the invention will be evident from the following detailed description of the preferred embodiments in conjunction with the attached drawings.

BRIEF DESCRIPTION OF THE DRAWINGS

FIG. 1 is a diagram showing the structure of an information processing system according to an embodiment of the present invention;

FIG. 25 is a diagram showing the structure of data in a packet for making invalid the synchronization flag for use in this embodiment;

DESCRIPTION OF THE PREFERRED EMBODIMENTS

Figure 2:
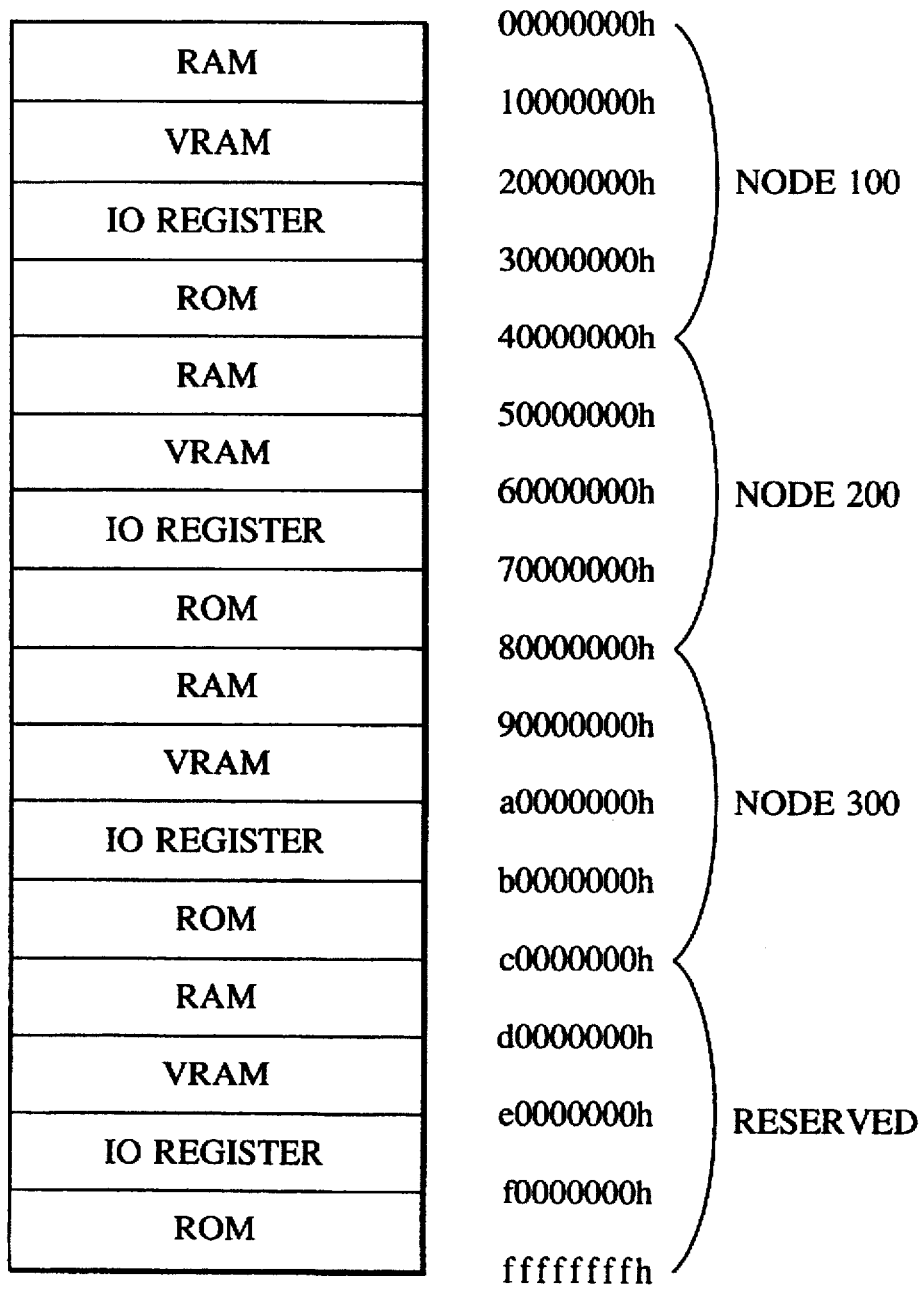
FIG. 2 is a diagram showing an address map of the information processing system according to this embodiment.

Preferred embodiments of the present invention will now be described with reference to the drawings.

First Embodiment

FIG. 1 is a block diagram showing the structure of an embodiment of a system using an information processing apparatus according to this embodiment.

Referring to FIG. 1, reference numerals 100, 200 and 300 represent nodes which are connected to one another through a connection path 10, such as a network cable. Although three nodes are connected in the structure shown in FIG. 1, the number of the nodes is not limited to this. The connection path 10 is a LAN exemplified by, for example, the IEEE 803.3 or 802.4 standards. The type of the connection path 10 is not limited thereto.

As shown in FIG. 1, the nodes respectively include CPUs 101, 201 and 301, memories 102, 202 and 302, connection path interface (I/F) circuits 103, 203, 303 for establishing the connections between the connection path 10 and each node, and internal buses 105, 205 and 305 for establishing the connections among the CPU, the memory, the I/F and the like in each of the corresponding nodes.

The connection path interface circuits 103, 203 and 303 include corresponding connection path interface controllers 104, 204 and 304 for performing processes, such as detection of commands relating to the synchronization and transmitted to internal buses 105, 205 and 305, and such as transmission, to the internal buses 105, 205 and 305, of synchronization information in accordance with information transmitted from another node.

In the information processing system according to this embodiment and having the structure shown in FIG. 1, synchronization information is transmitted through the connection path 10, and the connection path interface controller of each node emulates the synchronization information as information relating to synchronization on the internal bus, so that control of the synchronization among the CPUs over the nodes is performed where mutual bus monitoring cannot be performed.

A description will now be given about the operation for synchronizing CPUs in an examplar state where the CPU 101 in the node 100 and the CPU 301 in the node 300 intend to synchronize data in the memory 202 in the node 200.

FIG. 2 shows an address map of the overall memory for the information processing system according to this embodiment. In this embodiment, four giga bytes, which is the address space for the overall system, is divided into four memory spaces (each of which is composed of one giga byte), and three of the four memory spaces are respectively assigned to the nodes 100 to 300. Note that one memory space (C0000000h-ffffffffh: h indicates a hexadecimal number) of the four memory spaces is not assigned because the number of nodes is three.

The memory space of the node 100 is 00000000h-3fffffffh in which a RAM, a VRAM, an I/O register and a ROM are sequentially disposed starting at the leading address in the memory space. The memory space of the node 200 is 40000000h-7fffffffh, while the memory space of the node 300 is 80000000h-bfffffffh. The sequential order of the memories in the memory space in each node and the capacity of the memory and that of the register are arranged commonly to all nodes.

An assumption is made here that the CPU 101 of the node 100 uses the [LR] command to load data (four bytes) at address "41000000h" in the memory 202 in the node 200 and then intends to change the data by issuing the [SC] command because the reserve flag is valid. Furthermore, another assumption is made that the CPU 301 in the node 300 has completed the loading of data (four bytes) at address "41000000h" in the RAM of the memory 202 of the node 200 by using the [LR] command.

The process to realize the foregoing state will now be described with reference to FIG. 3 in such a manner that the operation of the node 100 is taken as an example.

Figure 3:
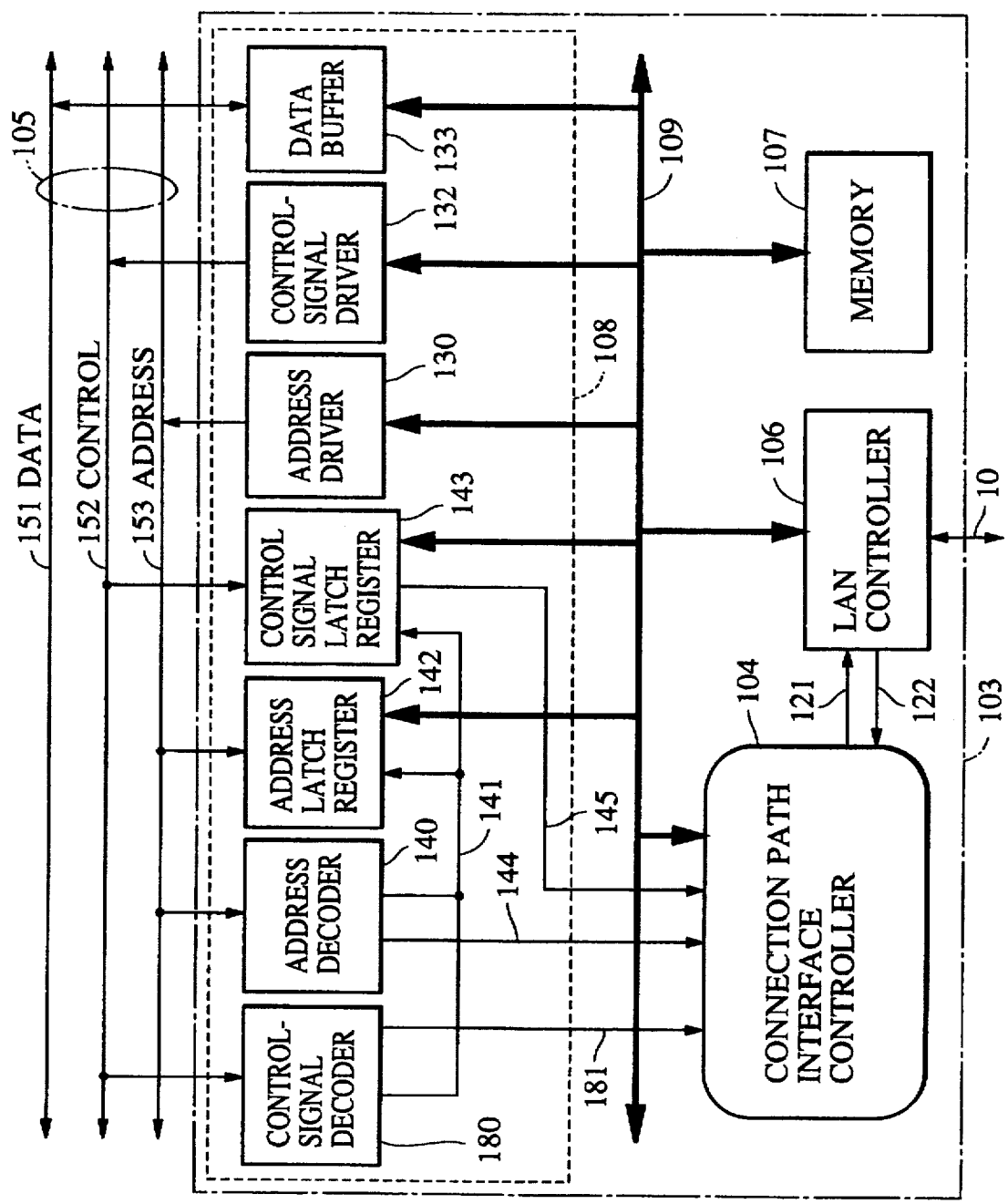
FIG. 3 is a block diagram showing the structure of a connection path interface for the node according to this embodiment.

FIG. 3 is a block diagram showing the structure of the connection path interface (I/F) 103, the structure of each of the connection path interface circuits of the other nodes having the same structure as that shown in FIG. 3.

The connection path interface 103 comprises the connection path interface controller 104, a LAN controller 106, a memory 107, a connection path interface internal bus 109 for connecting the foregoing elements, and a bus interface portion 108 for establishing the connection between the node internal bus 105 and the connection path interface internal bus 109.

An address decoder 140 disposed in the bus interface 108 constantly monitors the internal bus 105 (the internal bus 105 including a data signal line 151, a control signal line 152 and an address signal line 153) in the node 100. If the address decoder 140 recognizes generation of an access (an operation of reading address "41000000h") to an external node (the node 200 in this case) on the bus 105, it latches, in the address latch register 142, address data transmitted to the address signal line 153 at this time, and uses a latch signal 141 to instruct control information, such as the type of the demand, e.g. whether or not it is a reading demand or a writing demand (a reading demand in this case), and the number of bytes (four bytes in this case), to be transferred, existing on the control signal line 152 to be latched into the control-signal latch register 143.

Simultaneously, the address decoder 140 transmits an external access detection signal 144 to pass control to a program that is operated by the connection path interface controller 104. Also, simultaneously, a reading/writing demand signal 145 is sent from the control-signal latch register 143 to the connection path interface controller 104. Note that although a one-chip microcontroller is employed as the connection path interface controller 104 in this embodiment, the structure is not limited to a one-chip microcontroller. For example, the structure may be formed by hardware logic.

Figure 4:
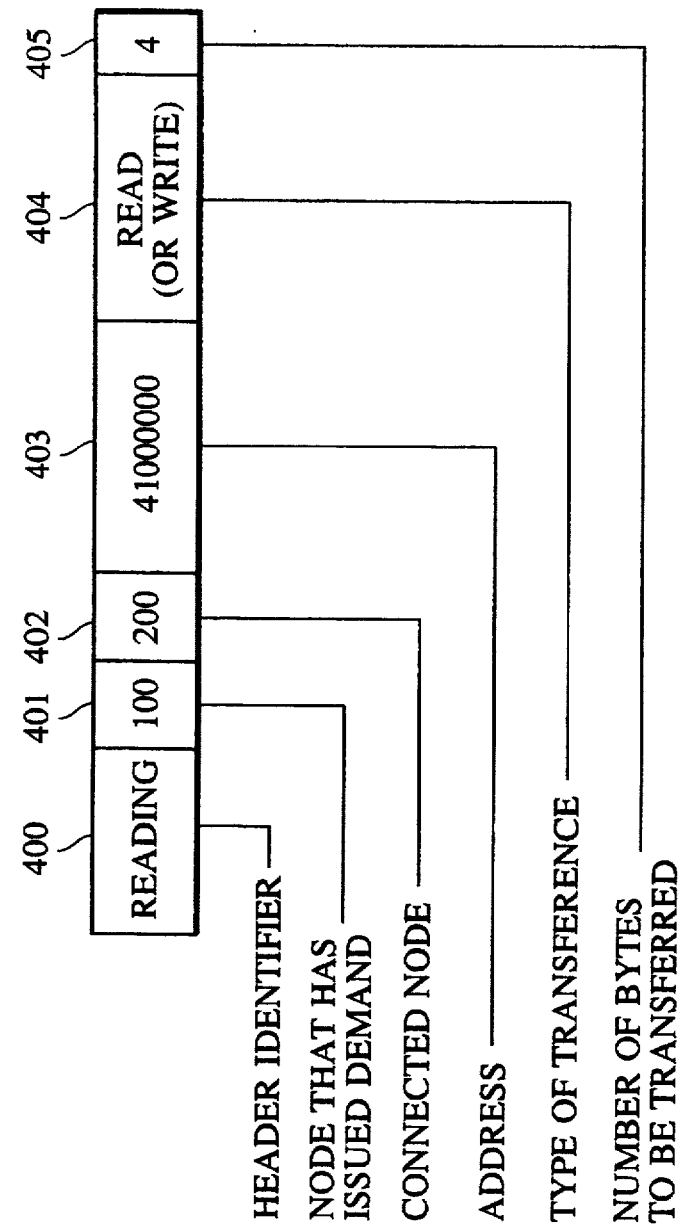
FIG. 4 is a diagram showing the structure of a data request packet data for use in the information processing system according to this embodiment.

The connection path interface controller 104, which has received the notification by means of the external access detection signal 144 and the reading/writing demand signal 145, reads signals from the address latch register 142 and the control-signal latch register 143 that have latched the signals so as to discriminate the portion to be accessed from the node 100. The connection path interface controller 104 makes a data request packet structured, for example, as shown in FIG. 4 and writes it in the memory 107. The connection path interface controller 104 transmits, to the LAN controller 106, a transmission demand signal 121 to request transmission. As a result, the LAN controller 106 receives the transmission demand to read a data request packet from the memory 107, and then performs a process, such that a header is added to the data, to convert the format into a desired type. Then, the LAN controller 106 transmits the packet data to the node 200 through the connection path 10.

Referring to FIG. 4, reference numeral 400 represents a header identifier, to which a header indicating reading (loading) is added. Reference numeral 401 represents the node 100 that has issued the request, 402 represents the node 200 that receives the request, and 403 represents access address "41000000h" of the memory in the node 200. Reference numeral 404 represents the type of transference, e.g. whether data is written or read. FIG. 4 shows a state where reading "read" is set. Reference numeral 405 represents the number of bytes to be read from the node 200, the number being "4" in the illustrated case.

The operation of the node 200 that receives packet data will now be described. Since the structure of the node 200 is the same as that of the node 100, the description given with reference to FIG. 3 is applicable here. Note that the first digit of each portion in the node 200 is given as "2" to indicate the node 200.

A LAN controller 206 of the node 200, that has recognized that the data packet on the connection path 10 is transmitted to the LAN controller 206, performs format conversion, such as removal of the header portion, and then writes the received data in the memory 207. Then, the LAN controller 206 transmits a receipt notification signal 222 to notify the connection path interface controller 204.

The connection path interface controller 204 of the node 200, that has received the foregoing notification, reads, from the memory 207, data that has been received from the node 100, so as to recognize the generation of a memory access (an operation of reading address "41000000h") from an external node (the node 100 in this case) to the node 200. Then, the connection path interface controller 204 instructs the address driver 230 to drive address "41000000h", and then instructs a control signal driver 232 to drive the transference size and a control signal for performing the loading command to the bus through a connection path interface internal bus 209.

Then, the read transaction is performed on the internal bus 205 of the node 200 so that data is stored into a data buffer 233. The connection path interface controller 204 transfers the data to the memory 207 and issues a transmission demand to the LAN controller 206.

Then, similarly to the foregoing process, data is transferred from the node 200 to the node 100, and the data of address "41000000h" is returned to the node 100. Thus, a sequence of data loading operations is completed, and the [LR] command is performed. When the foregoing operations have been completed, a reserve flag is set in the CPU 101 with respect to address "41000000h".

A similar process with respect to the node 300 is performed so that the [LR] command is performed among the respective nodes. When the foregoing operations have been completed, a reserve flag is set in the CPU 301 to correspond to address "41000000h".

Figure 5:
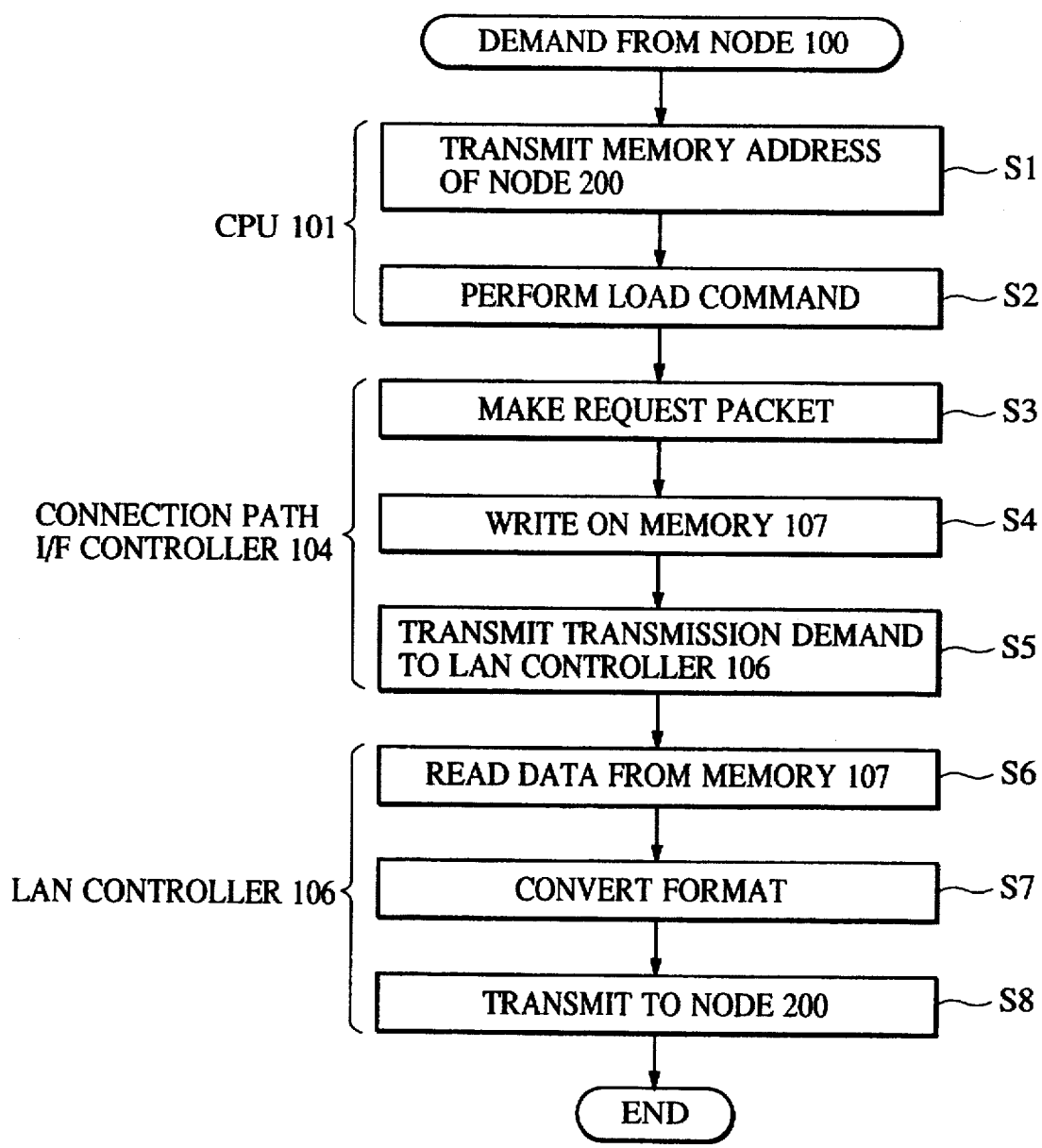
FIG. 5 is a flow chart showing a process for executing a load command from a node 100 according to this embodiment.

The foregoing operation will now be described with reference to flow charts shown in FIGS. 5 and 6. FIG. 5 is a flow chart of the operation to be performed in the node 100.

In step S1 the CPU 101 transmits the memory address ("41000000h" in the foregoing example), and in step S2 it issues a reading command. As a result, control is passed to the connection path interface controller 104, and in step S3 request packet data, for example structured as shown in FIG. 4, is made in accordance with the command issued by the CPU 101. The packet data is then written in the memory 107 (step S4). Then, the operation proceeds to step S5 so that a transmission demand is transmitted to the LAN controller 106.

After control is passed to the LAN controller 106, in step S6 the packet data is read from the memory 107, in step S7 the data is converted into the format that can be transmitted, and in step S8 it is transmitted to the node 200 through the connection path 10.

Figure 6:
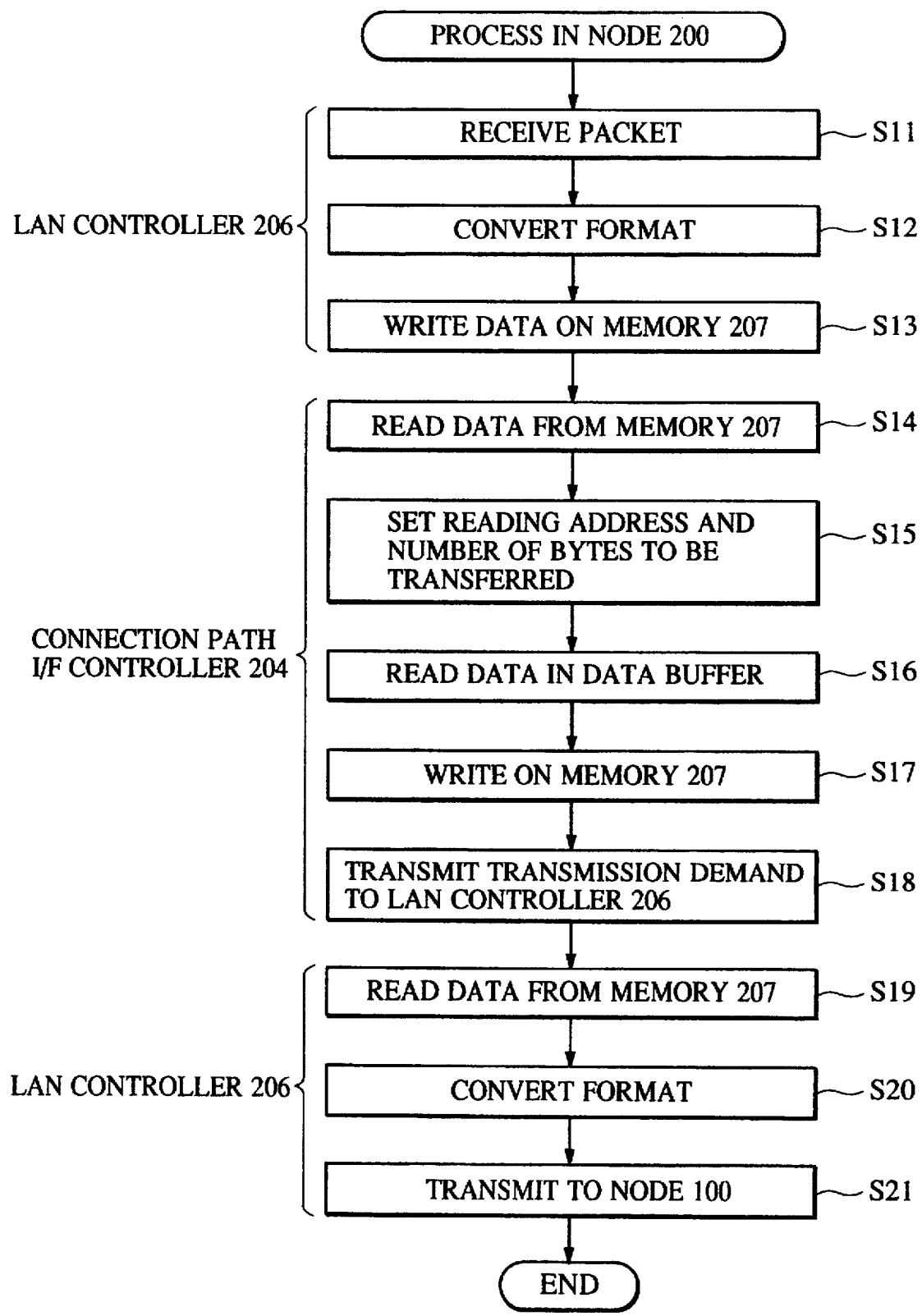
FIG. 6 is a flow chart showing a data reading (loading) process to be performed in a node 200 according to this embodiment.

FIG. 6 is a flow chart showing the processes to be performed by the connection path interface controller 204 and the LAN controller 206 in the node 200.

Initially, in step S11 packet data transmitted by the LAN controller 106 is received by the LAN controller 206, and in step S12 the format of the received data is converted. Then, the operation proceeds to step S13 so that the converted data is written in the memory 207. The foregoing process is performed by the LAN controller 206.

Then, control is passed to the connection path interface controller 204, and the operation proceeds to step S14 so that data is read from the memory 207. In step S15 the reading address and the number of bytes to be transferred, that are included in the read data, are extracted so as to set the address into the address driver 230 and to set, in the controller signal driver 232, the number of bytes to be transferred. As a result, data of the instructed number of bytes is read from the instructed address of the RAM so as to be stored in the data buffer 233. In step S16 data stored in the data buffer 233 is read. The operation proceeds to step S17 so that data is set into the memory 207, and in step S18 a transmission demand is transmitted to the LAN controller 206.

Control is again passed to the LAN controller 206 so that data set by the connection path interface controller 204 is read from the memory 207 (step S19), and in step S20 the format of read data is converted into a format that can be transmitted. The operation proceeds to step S21 so that data is transmitted to the node 100, and thus the operation is completed.

As a result, the node 100 is able to receive data of, for example, four continuous bytes from the leading address (41000000h) read by the node 200.

The process to be performed when the node 100 performs the [SC] command (conditional storing command) will now be described. Initially, the CPU 101 in the node 100 checks whether or not the reserve flag has been made invalid. In the foregoing case, the reserve flag has not been made invalid, and the storing operation appears on the internal bus 105.

Referring to FIG. 3, in a case where the address decoder 140 has recognized that access (an operation of writing on the address "41000000h") to an external node (the node 200 in this case) has been generated in the internal bus 105, control is passed to a program that is operated by the connection path interface controller 104, in response to the external access detection signal 144 and the reading/writing demand signal 145. Simultaneously, address data transmitted to the address signal line 153 at this time is latched to the address latch register 142, while control information, such as the type of the demand, e.g. whether or not it is a reading demand or a writing demand (a writing demand in this case), and the number of bytes (four bytes in this case) on the control signal line 152, is latched by the control-signal latch register 143.

At this time, the control-signal decoder 180 included in the bus interface apparatus 108 constantly monitors the control signal line 152. When the control-signal decoder 180 recognizes generation of the storing command (the [SC] command to address "41000000h" of the node 200 in this case) on the bus 105, it transmits a synchronization control demand detection signal 181 so as to notify the program that is operated by the connection path interface controller 104 that synchronization control is required.

Figure 7:
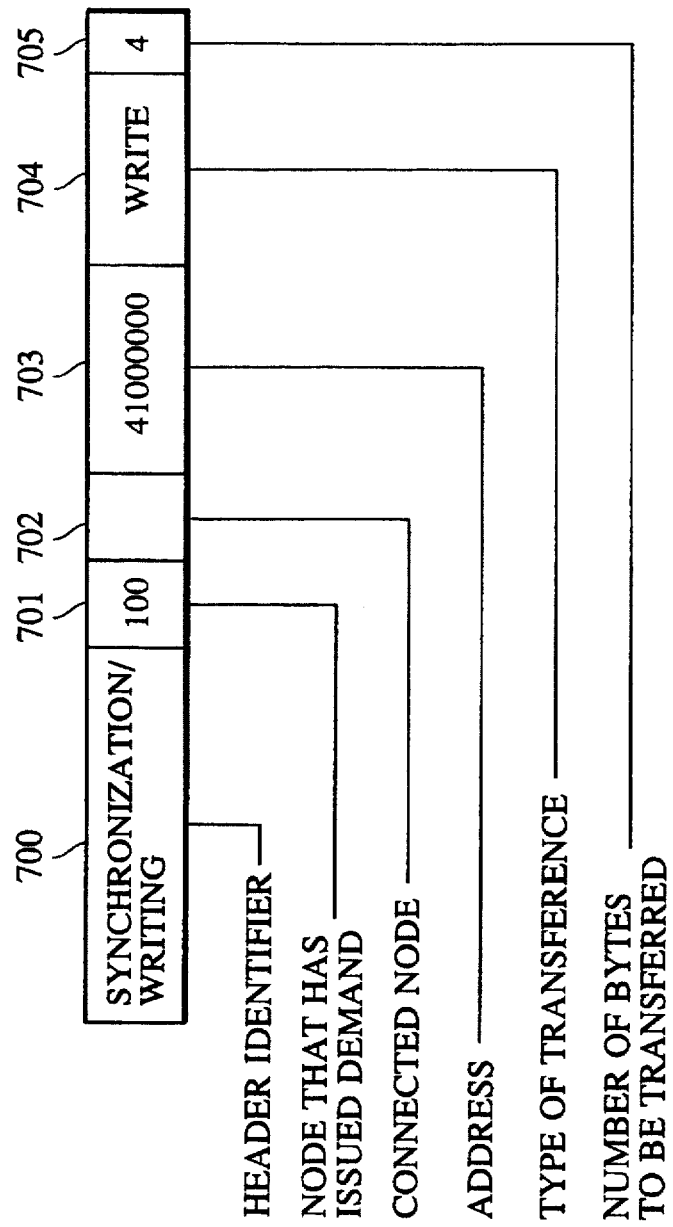
FIG. 7 is a diagram showing the structure of writing request packet data according to this embodiment.

The connection path interface controller 104, which has received the notification in response to the external access detection signal 144, the reading/writing demand signal 145 and the synchronization control demand detection signal 181, reads latched signals from the address latch register 142 and the control-signal latch register 143 so as to discriminate the portion to which the demand is transmitted. Then, the connection path interface controller 104 makes writing request packet data formed, for example, as shown in FIG. 7 to write the same in the memory 107. The foregoing packet data is a broadcast packet that requires all nodes that are connected to the connection path 10 to perform the process.

Referring to FIG. 7, reference numeral 700 represents a header identifier, on which data indicating synchronization or writing is written. Reference numeral 701 represents the node that has issued the demand, the node being 100 in this case and thus "100" being set. Reference numeral 702 represents the number of the connected node. Reference numeral 703 represents the set writing address ("41000000h"). Reference numeral 704 represents "write" indicating writing, and 705 represents the number of bytes to be written, which is "4" in this case.

Then, a transmission demand is issued to the LAN controller 106 in response to the transmission demand signal 121. The LAN controller 106, that has received the transmission demand signal 121, reads data from the memory 107 and performs a process, such as adding a header to the data, followed by converting the data into a required format. Then, the LAN controller 106 transmits the data to the connection path 10.

The operation of the node 300, that has received the packet data, will now be described. Since the structure of the node 300 is the same as that of the node 100, FIG. 3 is used to describe the node 300. Note that the first digit of each portion in the node 300 is given as "3" to indicate the node 300.

The LAN controller 306, that has recognized that the packet data transmitted to the connection path 10 is a broadcast packet, performs format conversion, such as removal of the header, after it has received the packet data. Then, the LAN controller 306 writes data in the memory 307. Then, the LAN controller 306 transmits a receipt notification signal 322 to the connection path interface controller 304 to acknowledge receipt of the data receipt. The connection path interface controller 304, that has received the foregoing notification, reads received data from the memory 307, and recognizes the generation of the writing access (an operation of writing on address "41000000 h") from one other node (the node 100 in this case) to yet another node (the node 200 in this case).

In the foregoing case, the reserve flag stored in the CPU 301 is made invalid in such a manner that the connection path interface controller 304 instructs the address driver 330 to drive address "41000000h". Then, the connection path interface controller 304, through an internal bus 309, instructs the control-signal driver 332 with the transference size and a control signal for performing a dummy storing operation. Furthermore, the connection path interface controller 304 instructs a data buffer 333 to drive dummy data to the internal bus 105.

The CPU 301, that has monitored the process of storing the dummy data as the [SS] function, checks the reserve flag stored therein and the register that has the address at which the flag is set. In this embodiment, since the addresses, on each of which the reserve flag is set, coincide with each other, the reserve flags are made invalid.

Since the address corresponding to address "41000000h" does not exist in the memory 302 of the node 300, the foregoing storing process is ignored. The connection path interface controller 304 prevents bus time out by instructing the control-signal driver 332 to drive an acknowledge signal after a predetermined delay.

Note that the foregoing sequential operations to be performed in the node 300 may be defined as address only transactions in a system comprising a CPU of a type in which the address bus and the data bus are controlled independently. In the foregoing case, the process for making invalid the reserve flag can be completed by the address phase process without driving of the dummy data on the bus.

In the node 200, which is the correct node to which data must be transferred, data is transferred by a procedure similar to the data reading procedure so that data is stored. At this time, the processor 201 in the node 200 performs the process of the [SS] function similarly to the operations in the node 300 so that checking of the synchronization flag of the CPU is performed so as to realize the synchronized operations.

As a result, synchronization of the CPUs is maintained at the time of performing the [SC] command in the node 100. Note that the foregoing description similarly applies to the data transference between the other nodes.

The process to be performed in the node 300 will now be described with reference to a flow chart shown in FIG. 8.

Figure 8:
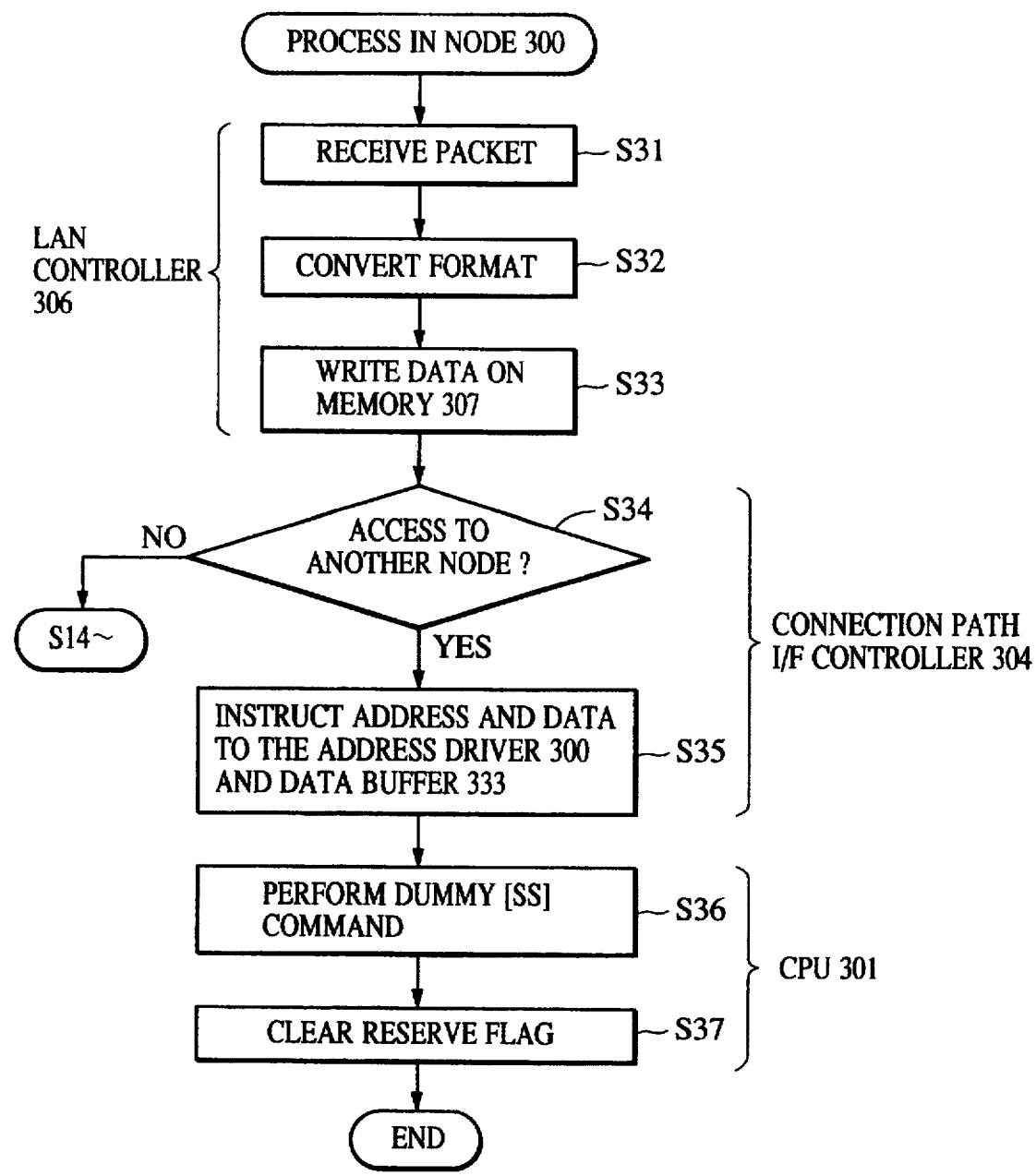
FIG. 8 is a flow chart showing a process for clearing a reserve flag to be performed in a node 300 according to this embodiment.

Referring to FIG. 8, the processes in step S31 to step S33 correspond to the processes in step S11 to step S13 shown in FIG. 6. In step S34 a discrimination is performed as to whether or not the demand is an access demand to the node 300. If the subject access is an access to the node 300, the operation proceeds to, for example, step S14 shown in FIG. 6 so that reading of data from the memory 307 and the like are performed.

If the access is not the access to the node 300, the operation proceeds to step S35 so that an instruction is issued to the address driver 330 to drive, for example, address "41000000h". Then, the transference size and a control signal for performing the dummy storing command are instructed to the control-signal driver 332 through the internal bus 309. Furthermore, an instruction is issued to the data buffer 333 to drive the dummy data to the internal bus 105.

As a result, the CPU 301 performs the operation of storing dummy data. The processor 301 in the node 300, that has identified the [SS] function, checks the reserve flag of the processor 301 and the register storing the address at which the flag is set. Since the addresses coincide with each other, the reserve flag is made invalid.

In a case of the synchronization command to data in the memory of the node 100, specifically, in a case where the CPU 101 in the node 100 loads data (four bytes) of address "01000000h" in the RAM of the node 100 by using the [LR] command and changes the same by issuing the [SC] command, synchronization to be performed will now be described.

Referring to FIG. 3, the external access detection signal 144 is not activated but the reading/writing demand signal 145 and the synchronization control demand detection signal 181 cause control to be passed to the program that is operated by the connection path interface controller 104. Simultaneously, address data, transmitted to the address signal line 153 at this time, is latched by the address latch register 142, and control information, such as the number of bytes (four bytes) to be transferred, is latched by the control-signal latch register 143.

Figure 9:
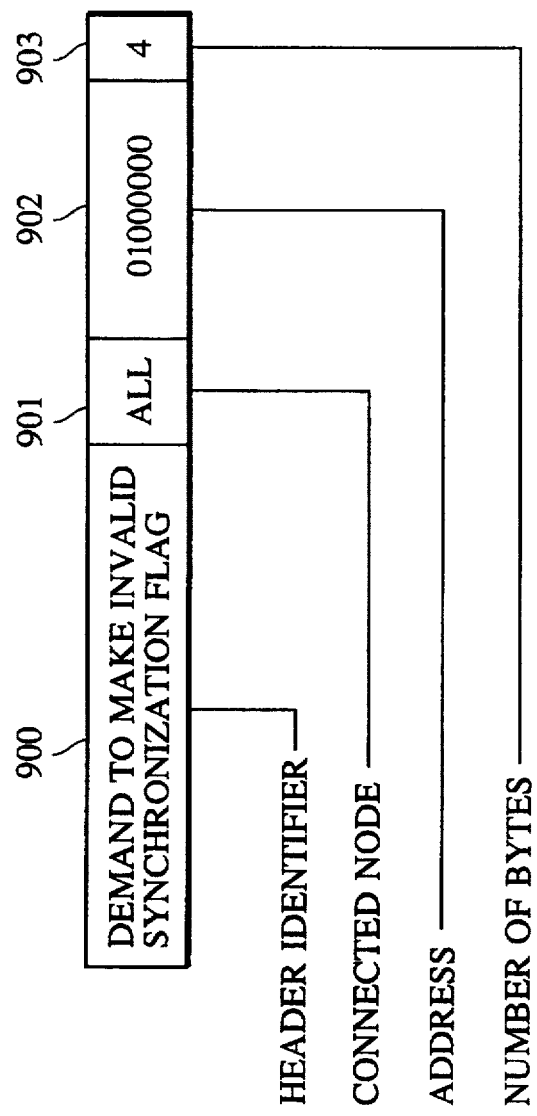
FIG. 9 is a diagram showing the structure of packet data for demanding synchronization maintenance according to this embodiment.

The connection path interface controller 104 reads signals latched by the address latch register 142 and the control-signal latch register 143 to make a synchronization maintenance request packet as shown in FIG. 9 to write it in the memory 107, the packet data having a broadcast address.

Referring to FIG. 9, reference numeral 900 represents an identifier that indicates a synchronization invalid demand flag, 901 represents a connected node which is set to "all" in this case, 902 represents an address which is set to "01000000h" in this case, and 903 represents the number of bytes which is set to "4" and indicates four bytes.

Then, the connection path interface controller 104 issues a transmission demand to the LAN controller 106 so that the packet is distributed to other nodes through the connection path 10.

Since the following operations are the same as those of the foregoing case, they are omitted from description.

Figure 10:
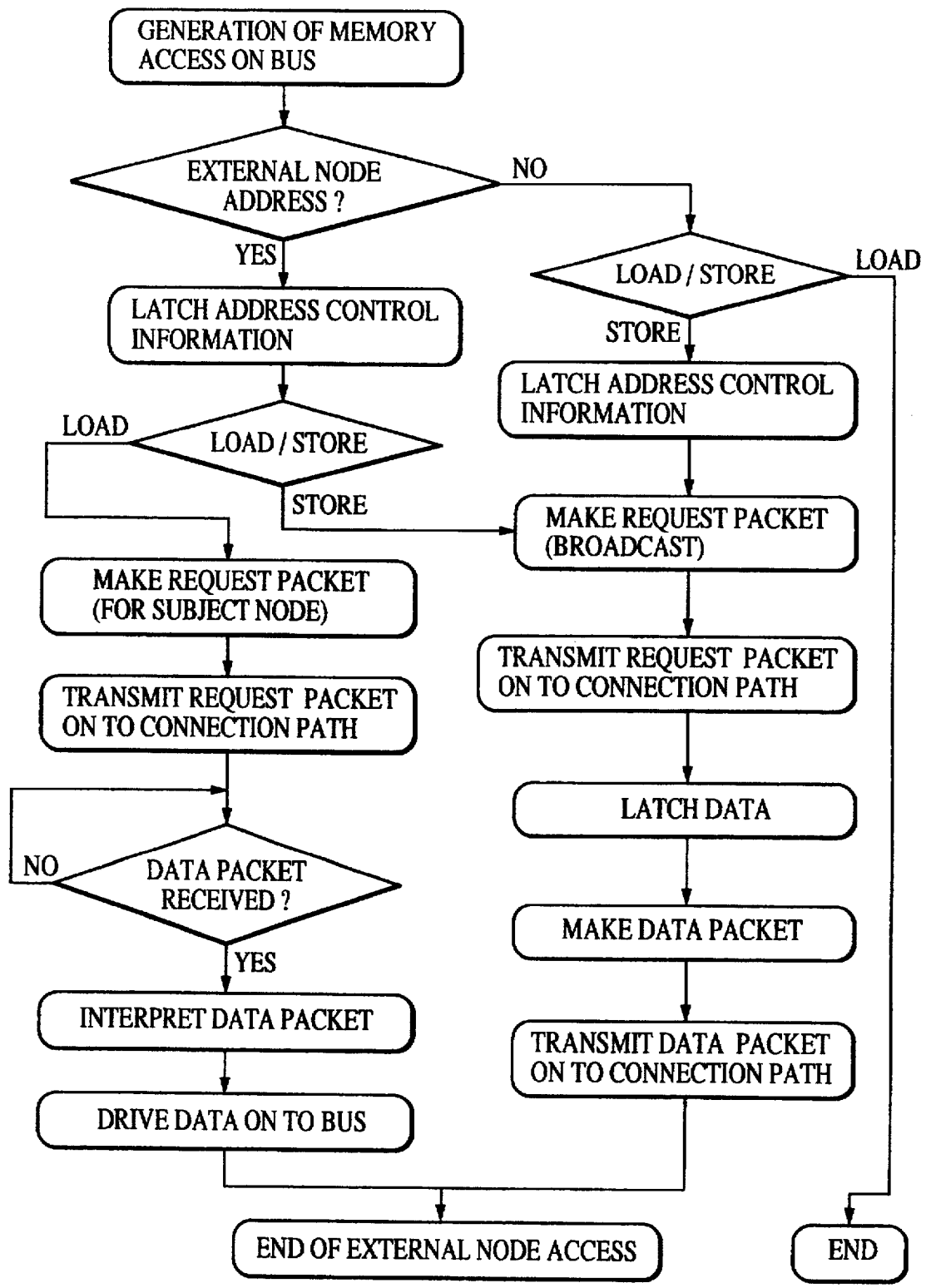
FIG. 10 is a flow chart showing a process according to this embodiment to be performed when memory access takes place on a bus.
Figure 11:
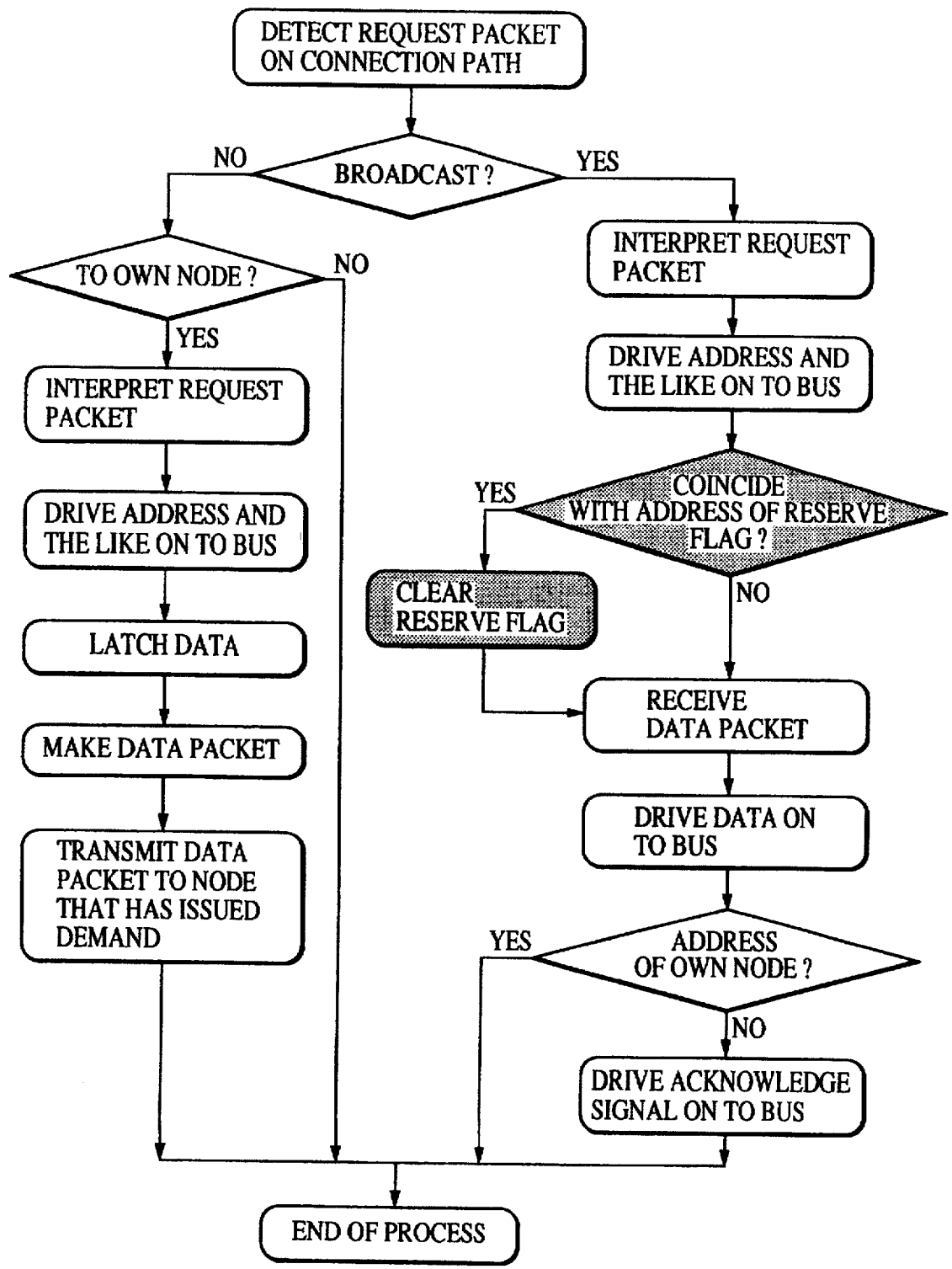
FIG. 11 is a flow chart showing a process according to this embodiment to be performed when a request packet has been detected on a connection path.

FIGS. 10 and 11 are flow charts mainly showing the operation of the connection path interface according to this embodiment. FIG. 10 shows a case where a memory access has been generated on the bus, and FIG. 11 shows a process to be performed when a request packet has been detected on the connection path. Since some portions overlap in the foregoing description, only a brief description will be made.

Referring to FIG. 10, whether or not the address requested on the bus is an address corresponding to an external node is checked. If it is the address of an external node, the address and control information are latched to determine whether the command is a loading (reading) command or a storing (writing) command. If the command is a loading command, a request packet is made for the node corresponding to the address and it is transmitted to the connection path. As a result, the loading command is performed in the subject node. If the loaded data is received as packet data, the packet data is interpreted so as to be driven on to the bus.

If the received command is a storing command, a request packet is made so as to be transmitted on to the connection path, data to be stored is received and latched, and a data packet is made so that the data packet is transmitted to the corresponding node through the connection path.

If the address of the memory access is the address of the node issuing the command (the "own" node), the process determines whether the command is a loading command or a storing command. If the command is a loading command, the process is completed. If the command is a storing command, the address and control information are latched, a request packet is made, and a process similar to the process to be performed when the storing command is received is performed.

Referring to FIG. 11, when the request packet has been detected on the connection path, whether or not the request packet is a broadcast packet is detected. If the request packet is broadcast, the address is driven on to the bus. If the address coincides with the address of the reserve flag, the flag is cleared in the CPU. When a data packet is then received, the data is driven onto the bus. If the address is not the address of the own node, an acknowledge signal is driven onto the bus.

If the request packet is not broadcast, whether or not it is transmitted to the own node is detected. If it is not transmitted to the own node, the process is completed. If it is transmitted to the own node, its request packet is interpreted and the address is driven onto the bus. Then, data is latched and a data packet is made, the data packet being then transmitted to the node that has issued the demand. Then, the process is completed.

Second Embodiment

In the foregoing embodiment, the invalidation process for maintaining synchronization among CPUs in different nodes is performed in such a manner that the process demand, communicated from a node that has issued the demand, is realized as a dummy writing process in each node. However, a synchronizing apparatus for the nodes can be advanced so that synchronization among CPUs in different nodes is controlled even more effectively. An example of the foregoing structure will now be described with reference to FIG. 12.

Figure 12:
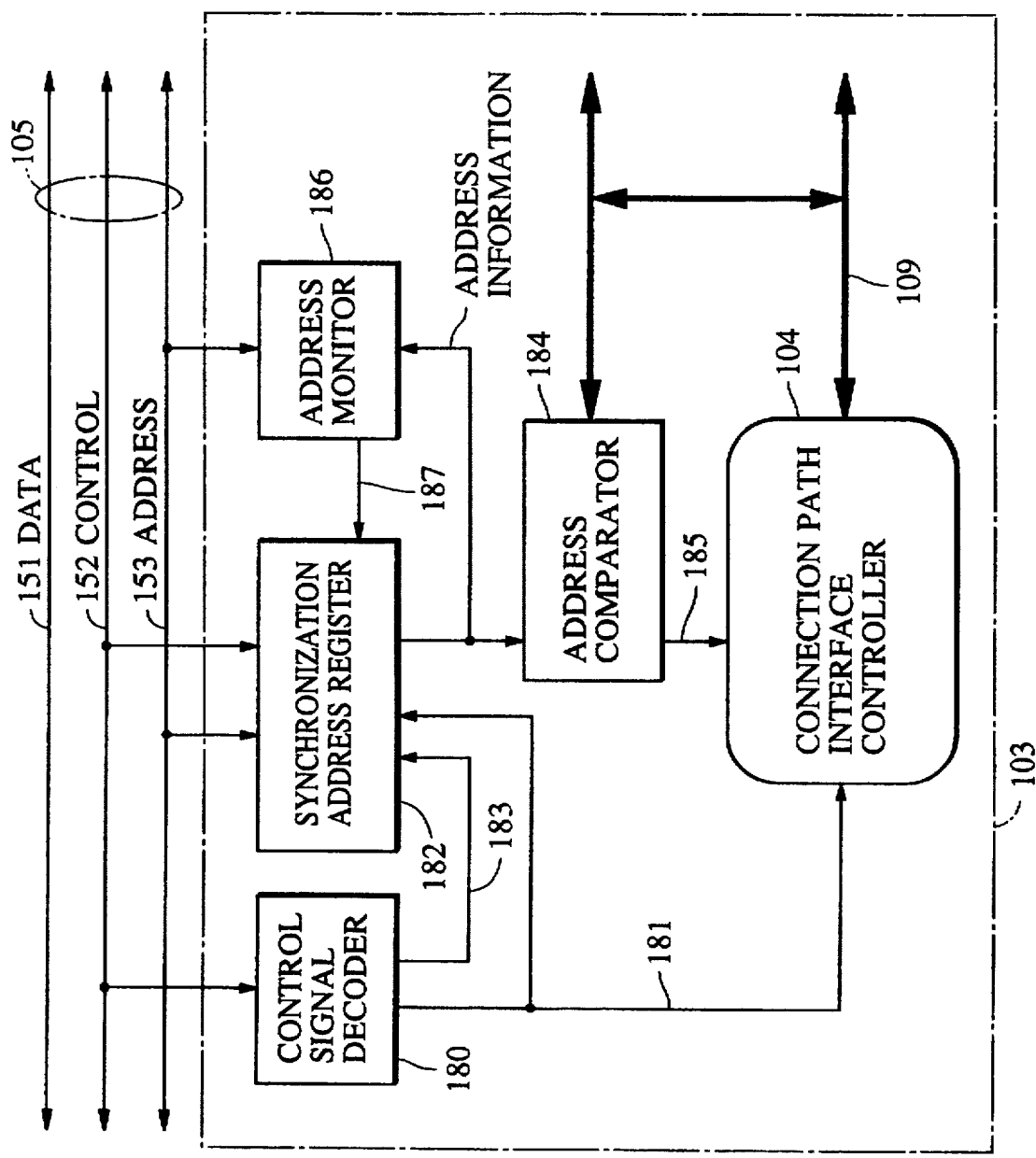
FIG. 12 is a block diagram partially showing the structure of a connection path interface according to another embodiment of the present invention.

FIG. 12 is a block diagram showing the structure of a portion of a connection path interface controller. The node 100 is taken as an example and the reference numerals of the foregoing embodiment are employed where they define the same element.

The bus interface 108 comprises the control-signal decoder 180 and the synchronization control demand detection signal 181 shown in FIG. 3 and further comprises a synchronization address register 182, a [LR] command detection signal 183, an address comparator 184, and a synchronization transaction demand signal 185.

The control-signal decoder 180 constantly monitors the control signal line 152 of the internal bus 105. If the control-signal decoder 180 recognizes generation of the [LR] command on the bus 105, it transmits the [LR] command detection signal 183 to communicate this to the synchronization address register 182. The synchronization address register 182 that has communicated this in response to the [LR] command detection signal 183 stores the address, at which the [LR] command passing through the internal bus 105 at present has been performed, and the number of the CPU that is performing the bus transaction.

Address information 187 registered in the synchronization address register 182 is supplied to an address bus monitor 186 and the address comparator 184. If the address bus monitor 186 has, on the internal bus 105, detected the same address as that supplied from the synchronization address register 182, it drives the address coincidence signal 187 to the synchronization address register 182. If it has detected simultaneous driving of the address coincidence signal 187 and the synchronization control demand detection signal 181, the synchronization address register 182 clears address information stored therein.

The connection path interface controller 104, that has detected receipt of the synchronization control demand from another node, supplies, to the address comparator 184 through the bus 109, address information indicated in the packet supplied from the other node. The address comparator 184 detects whether or not the address information coincides with the address information registered in the synchronization address register 182. If they coincide with each other, it means that a CPU has issued the [LR] command to the address corresponding to that node. Therefore, a flag invalid process with respect to the CPU that has the reserve flag is performed. Only in the foregoing case is the synchronization transaction demand signal 185 driven to the connection path interface controller 104. The connection path interface controller 104, that has received the synchronization transaction demand signal 185, performs the foregoing process for maintaining the synchronization among CPUs.

As a result, the undesirable generation of bus transaction can be prevented, and therefore the process for synchronizing CPUs in different nodes can be performed.

The present invention may be adapted to a system comprising a plurality of apparatuses or just one apparatus. The present invention may be adapted to the case where a program for executing the present invention is supplied.

As described above, according to this embodiment, synchronization control can be realized among nodes that cannot perform mutual bus monitoring. By synchronizing a plurality of CPUs as described above, their application to a larger computer system is enabled.

As described above, according to this embodiment, synchronization control among nodes can be performed.

According to this embodiment, synchronization control among CPUs in different nodes can be performed.

As described above, according to this embodiment, information required to perform the synchronization operation in a node or among nodes is sent through a connection path, and, at least a portion or all of information is reflected to the node in accordance with the transmitted information. Thus, synchronization among CPUs over nodes can be realized.

Third Embodiment

Figure 13:
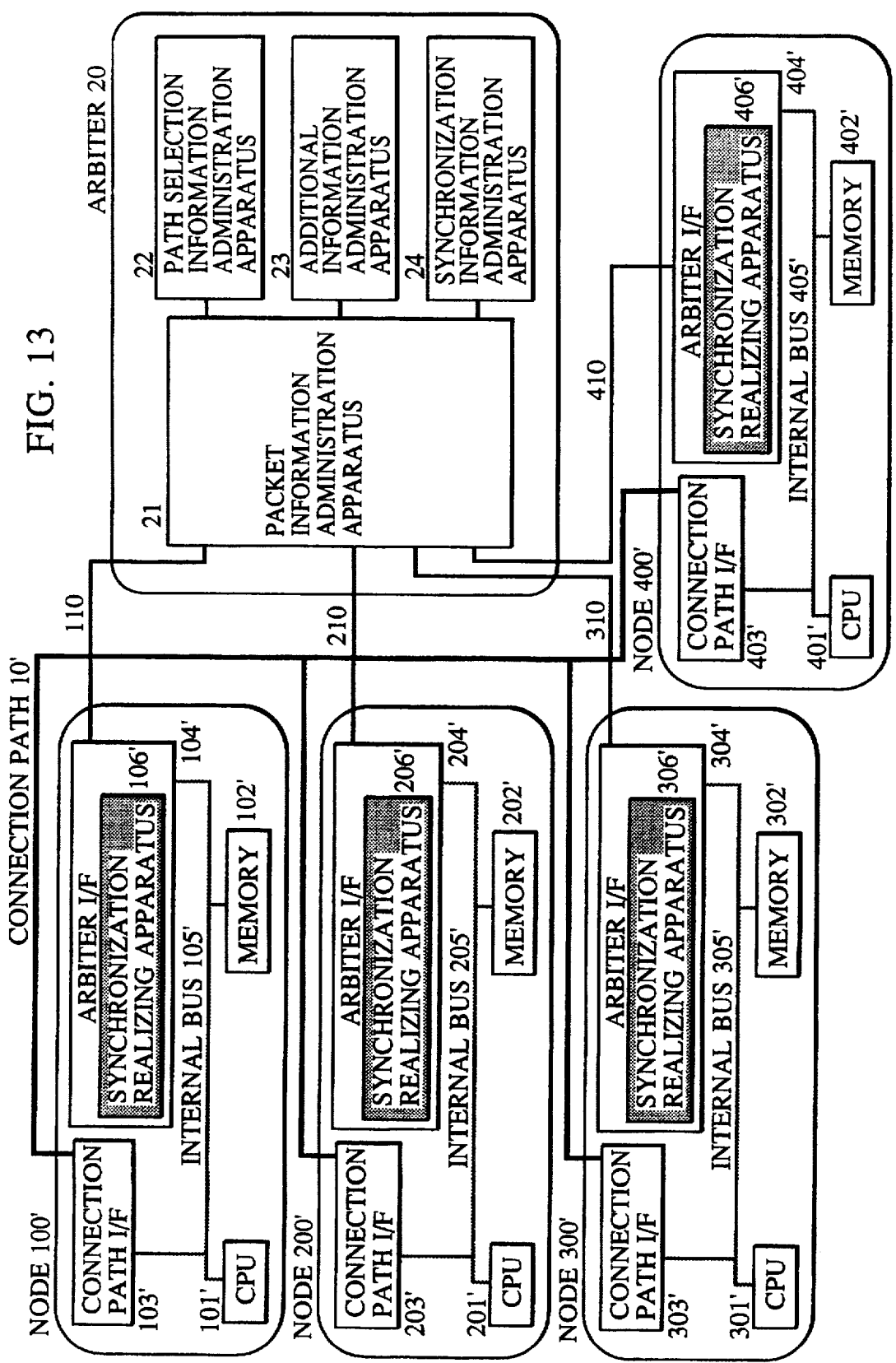
FIG. 13 is a diagram showing a system according to a third embodiment of the present invention.

FIG. 13 is a diagram showing the structure of a system according to a third embodiment of the present invention.

Reference numerals 100', 200', 300' and 400' represent nodes that are connected to one another by the connection path 10' comprising an optical fiber. The nodes includes corresponding CPUs 101', 201', 301' and 401', memories 102', 202', 302' and 402', interface circuits 103', 203', 303' and 403' for establishing the connection between the connection path 10' and the inside portion of each node, arbitration interface circuits 104', 204', 304' and 404' for demanding use of the connection path 10', and internal buses 105', 205', 305' and 405' for mutually connecting the foregoing elements to one another.

The arbitration interface circuits 104', 204', 304' and 404' include synchronization realizing apparatuses 106', 206', 306' and 406' for detecting and emulating commands relating to the synchronization. The structure is not limited to the structure shown for this embodiment.

Reference numeral 20 represents an arbiter for arbitrating the use of the connection path 10, the arbiter 20 being connected to each node through arbitration signal paths 110, 210, 310 and 410.

The arbiter 20 includes a packet information administration apparatus 21 for administrating the packet transmitted from each node, the arbiter 20 further including a path selection information administration apparatus 22 for administrating path demand information of information included in the packet, an additional-information administration apparatus 23 for temporarily storing additional information generated at the time of transferring data, such as an address that is supplied to follow the foregoing information, and a synchronization information administration apparatus 24 for temporarily storing information in the packet for realizing the mechanism for synchronizing CPUs as well as performing control to again distribute protocol information to each node.

In this embodiment, in the system as shown in FIG. 13, synchronization information is centrally administrated through the arbiter, and information is broadcast from the arbiter to each node so that the mechanism for synchronizing CPUs in different nodes is realized in a state where mutual bus monitoring cannot be performed.

Specifically, an example will now be given of the operation for maintaining the synchronization among CPUs where the CPU 101' on the node 100' and the CPU 301' on the node 300' intend to synchronize each other with respect to data in the memory 202' on the node 200'.

Figure 14:
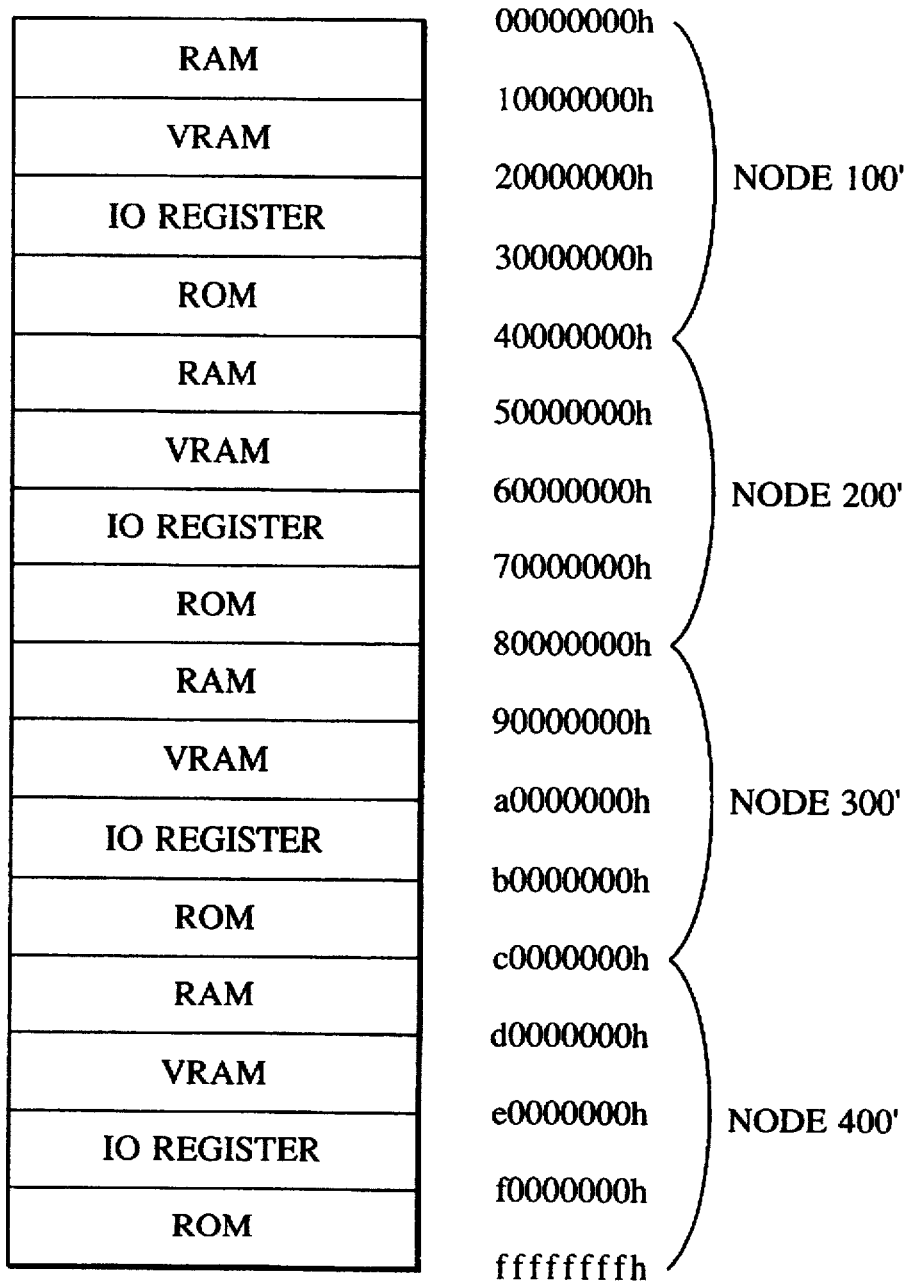
FIG. 14 is a diagram showing an address map of the system according to the third embodiment of the present invention.

FIG. 14 is an address map of the overall system. In this embodiment, the address space is the same as in the first embodiment, except that the four giga bytes of the address space of the system are assigned to the four nodes.

An assumption is made that the CPU 101' in the node 100' has loaded data (four bytes) at address "41000000h" on the RAM 202' of the node 200' by using the [LR] command, and it intends to change the data by issuing the [SC] command because the reserve flag is valid.

The process for loading data at address 41000000h in the RAM of the node 200' into the processor 101' in the node 100' can be performed by reading data among nodes, as disclosed in U.S. Pat. No. 5,602,663.

Another assumption is made that also the CPU 301' in the node 300' has loaded data (four bytes) at address "41000000h" on the RAM 202' of the node 200' by using the [LR] command, and the reserve flag is valid.

Figure 15:
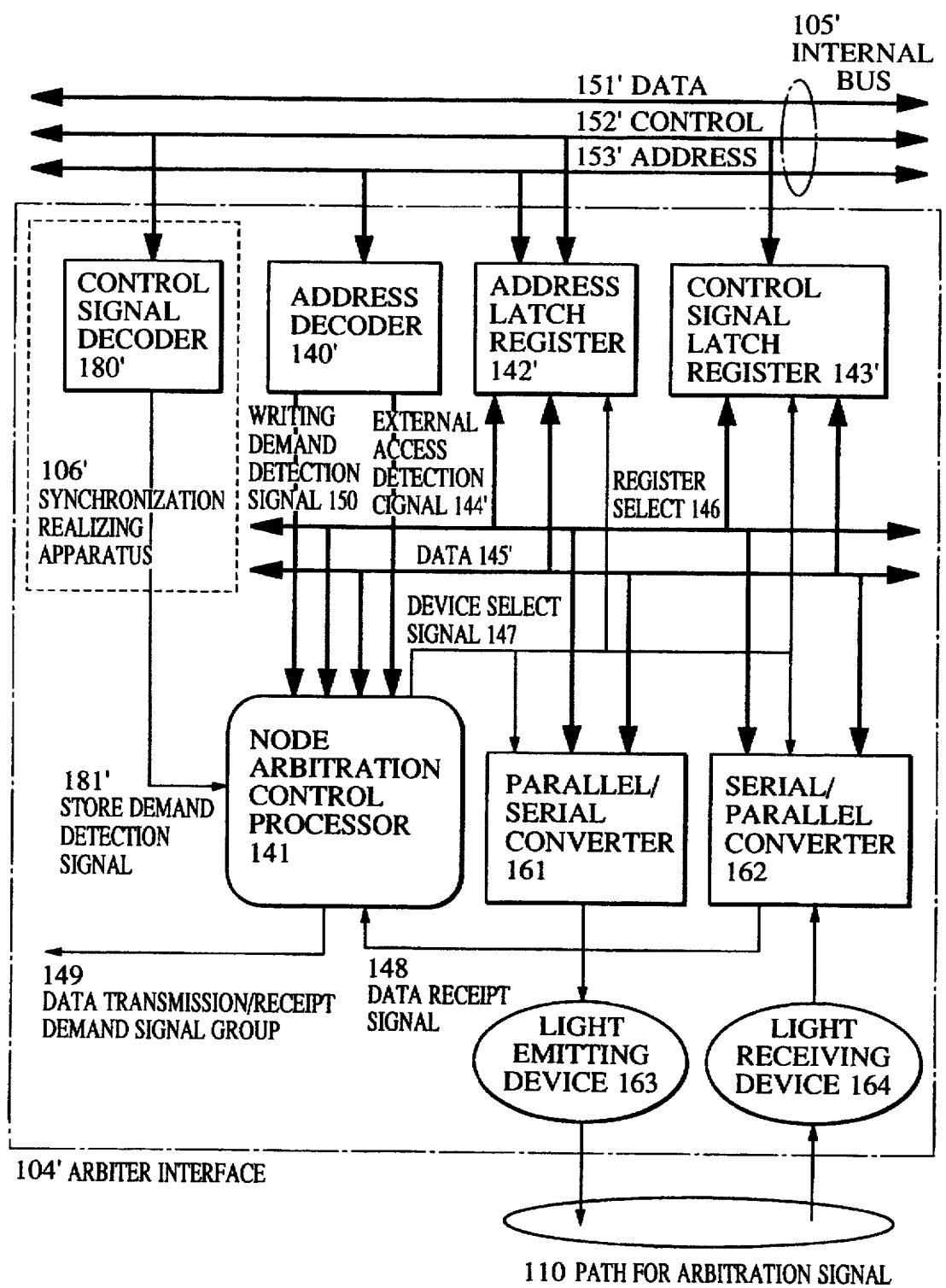
FIG. 15 is a diagram showing an arbiter interface of a node according to the third embodiment of the present invention.

FIG. 15 is a block diagram showing an arbiter interface 104'.

The address decoder 140' disposed in the arbiter interface 104' constantly monitors the internal bus 105' (consisting of the data signal line 151', the control signal line 152' and the address signal line 153') of the node 100'. If the address decoder 140' has recognized, on the bus, the generation of an access (an operation of writing on address 41000000h) to an external node, it passes control to a program that is operated on the node arbitration control processor 141', by means of the external access detection signal 144' and a writing demand detection signal 150. Simultaneously, the address appearing on the address signal line 153' is latched by the address latch register 142', while control information, such as the type of the demand, e.g. whether it a reading demand or a writing demand, and the number of bytes (four bytes) to be transferred, is latched by the control-signal latch register 143'.

Although the node arbitration control processor 141' comprises a one-chip microcontroller in this embodiment, the structure is not limited to this. It may comprise hardware logic.

Simultaneously, a control-signal decoder 180' disposed in the synchronization realizing apparatus 106' included in the arbiter interface 104' constantly monitors the control signal line 152'. If it has recognized generation of a storing command (a [SC] command to address 41000000h on the node 200' in this case), it communicates to the program, which is being operated on the node arbitration control processor 141', that synchronization control is required by transmitting a store demand detection signal 181'.

Figure 16:
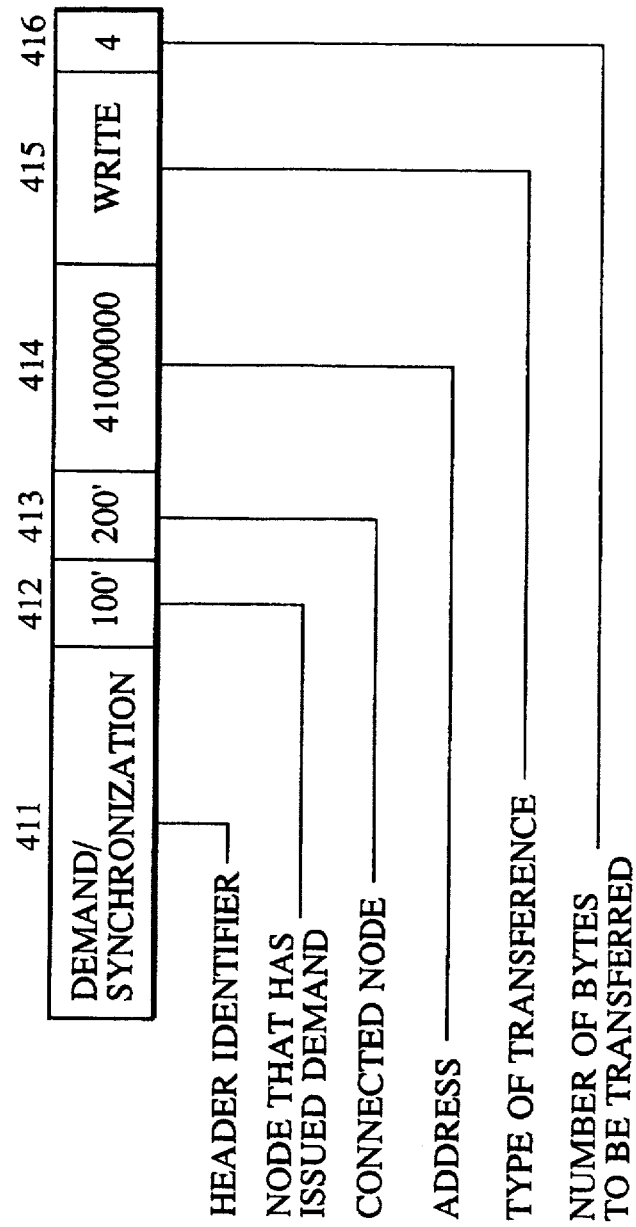
FIG. 16 is a diagram showing the structure of an arbiter request packet.

The node arbitration control processor 141', that has been notified in response to the signals 144', 150 and 181', reads the address and control information latched by the address latch register 142' and the control-signal latch register 143' to discriminate the connected node. Then, the node arbitration control processor 141' makes an arbitration request packet as shown in FIG. 16 to write it on a parallel/serial converter 161. The packet shown in FIG. 16 is a path demand signal and includes, as information, a portion for communicating the synchronization control demand to the arbiter.

The parallel/serial converter 161 converts written information into serial data so as to transmit serial data to a light emitting device 163. The light emitting device 163 photoelectrically converts the supplied signal to transmit it as a light signal having a wavelength of λ1 to the arbiter 20 through the communication path 110 comprising an optical fiber. The foregoing structure is common to all nodes. Note tas an L light emitting device is a device such as an LED or a laser emitting device, and that the light receiving device is a device typified by a photodiode.

Figure 17A:
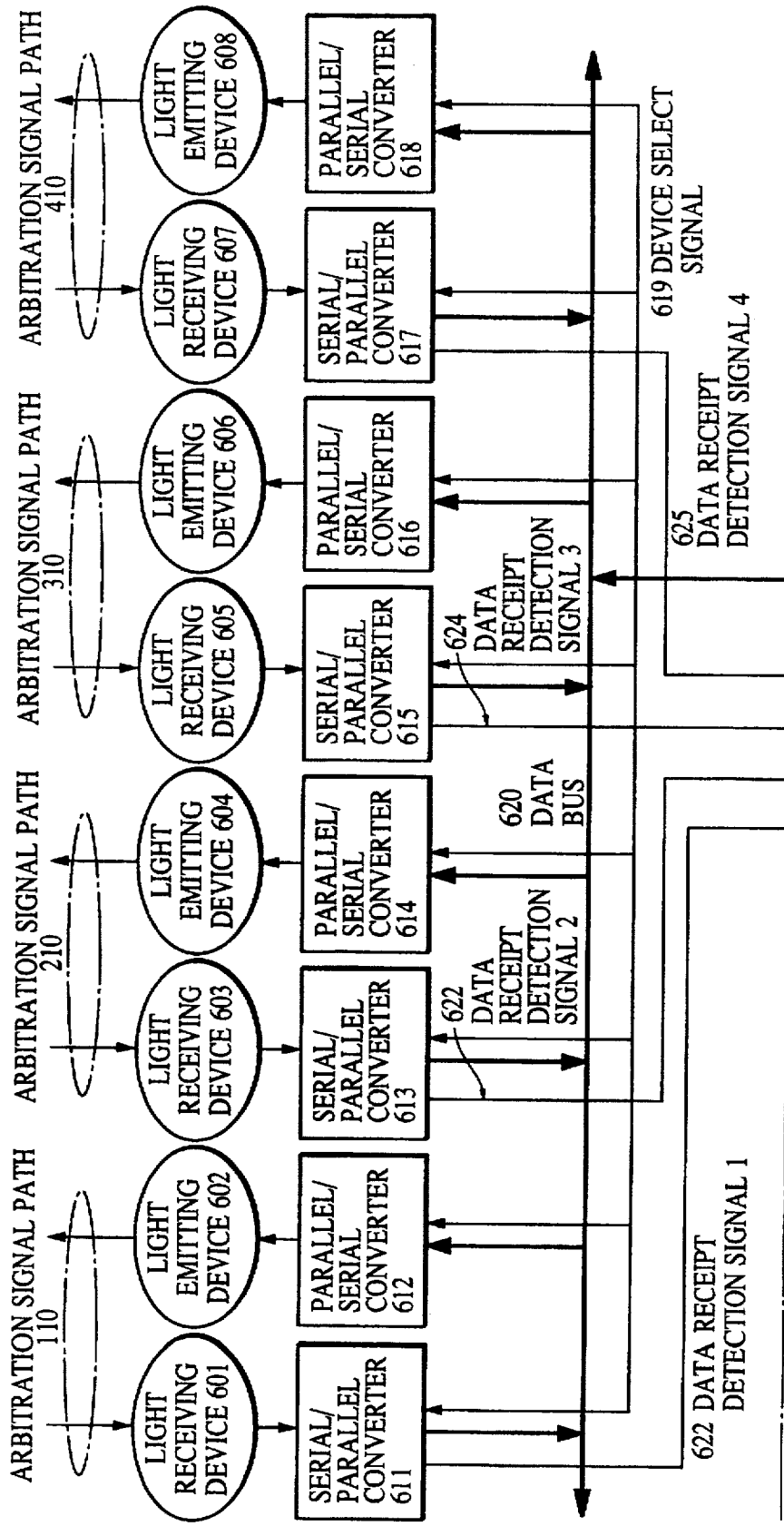
FIGS. 17 which include 17A and 17B is a diagram showing the structure of an arbiter according to the third embodiment of the present invention.

FIG. 17A and 17B show a block diagram showing the arbiter 20. Reference numerals 601, 603, 605 and 607 represent light receiving devices each of which receives a light signal having a wavelength of λ1 emitted by each node, that is, the foregoing arbitration request signal, so as to convert it into an electric signal. If a request signal is supplied from the node 100' and received by the serial/parallel converter 611, the serial/parallel converter 611 converts the supplied serial electric signal into a parallel signal. Simultaneously, a data receipt detection signal 622 is transmitted to the packet information administration apparatus 21 to indicate receipt. The packet information administration apparatus 21 according to this embodiment comprises a microcontroller 621 that includes a ROM storing a program and a RAM for use in performing the process.

The microcontroller 621 includes portions that serve as a path selection information administration apparatus 22, an additional-information administration apparatus 23, a synchronization control information administration apparatus 24. However, the structure used is not limited to the foregoing structure.

When the packet information administration apparatus 21 has received the data receipt detection signal 622, it uses a device selection signal 619 to select the serial/parallel converter 611 to read, from the internal register through the data bus 620, a request packet transmitted from the node 100'. Information about the number of the node that has issued the demand, among information included in the request packet, is transmitted to the path selection information administration apparatus 22 so that the portion of additional information relating to the transference of data is stored in the portion of the microcontroller 621 that serves as the additional-information administration apparatus 23. If a discrimination has been performed that the foregoing packet relates to the operation for synchronizing CPUs, the operation for synchronizing the CPUs is required. Therefore, information in the request packet about the address and the number of the node that has issued the demand is stored in the portion of the microcontroller 621 that serves as the synchronization control information administration apparatus 24.

The path selection information administration apparatus 22 interprets received data to recognize that the demand to use the path is a demand from the node 100' to the node 200' to establish a connection between the same. Furthermore, the path selection information administration apparatus 22 checks a flag indicating a state of use of the path disposed in the path selection information administration apparatus 22 and the wavelength that is being used. If the path can be used, it sets the flag to a state indicating that the path is being used, and makes packets for demanding that the connection shown in FIG. 18 be prepared to write the packets on the parallel/serial converters 612 and 614. The packet for demanding connection preparation includes information supplied from the portion of the microcontroller that serves as the additional-information administration apparatus 23, and information about the wavelength. The two packets for demanding connection preparation are in the form of λ1 light signals similarly to the case of the light arbiter interface, the two packets being transmitted to the nodes 100' and 200'. Note that the four nodes use different wavelengths λ2 and λ3 for the purpose of performing data communication so that two systems of communications are performed between two nodes.

Figure 19:
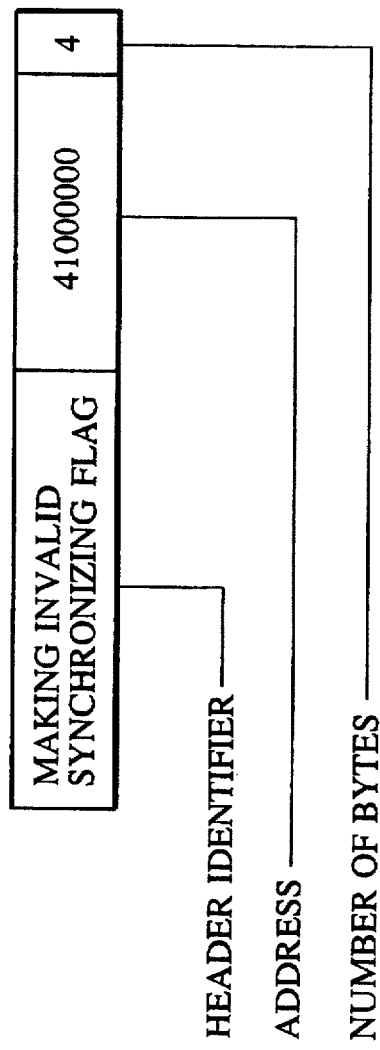
FIG. 19 is a diagram showing the structure of a packet for making invalid a synchronization flag.

In accordance with information supplied to the synchronization control information administration apparatus 24, the synchronization control information administration apparatus 24 maintains synchronization between CPUs in respective nodes by making packets for making invalid the synchronization flag as shown in FIG. 19, and by writing the packets on the parallel/serial converters 616 and 618 in order to make invalid a reserve flag that corresponds to address 41000000h if the reserve flag has been set with respect to the nodes 300' and 400'.

In the foregoing case, if the foregoing converters and the like have been used to arbitrate the connection path, completion of their use is waited for, and the packets for making invalid the synchronization flag are transferred.

The two packets for making invalid the synchronization flag are in the form of λ1 light signals similarly to the case of the light arbiter interface and are transmitted to the nodes 300' and 400' through arbitration signal lines 310 and 410.

The operation for making invalid the reserve flag in order to maintain the synchronization among CPUs in the nodes 300' and 400' will now be described by taking the operation in the node 300' as an example.

Since the structure of the node 300' is the same as that of the node 100', FIG. 15 is used to describe the structure. In the node 300', a light signal supplied through a fiber 310 (110 in FIG. 15) is converted into an electric signal by a light receiving device 164' so as to be supplied to a light arbiter interface 304'(104' in FIG. 15). In the light arbiter interface 304', the supplied signal is converted into a parallel signal by a serial/parallel converter 162. Simultaneously, a data receipt signal 148 is transmitted to the node arbitration control processor 141 to indicate this.

If the foregoing notification has been detected, the node arbitration control processor 141 of the node 300' uses the device select signal 147 and the data bus 145' to read the foregoing packets for making invalid the synchronization flag from the serial/parallel converter 162 and demand the inside of the node to allow use of the internal bus 305'. If the use of the internal bus is allowed, the node arbitration control processor 141 uses a data transmission demand signal group 149 to instruct the connection path interface 303' to transmit a bus access on to the internal bus 305' in order to make invalid a reserve flag that is set by a CPU in relation to address 41000000h in accordance with the contents of the packet shown in FIG. 19.

Figure 20:
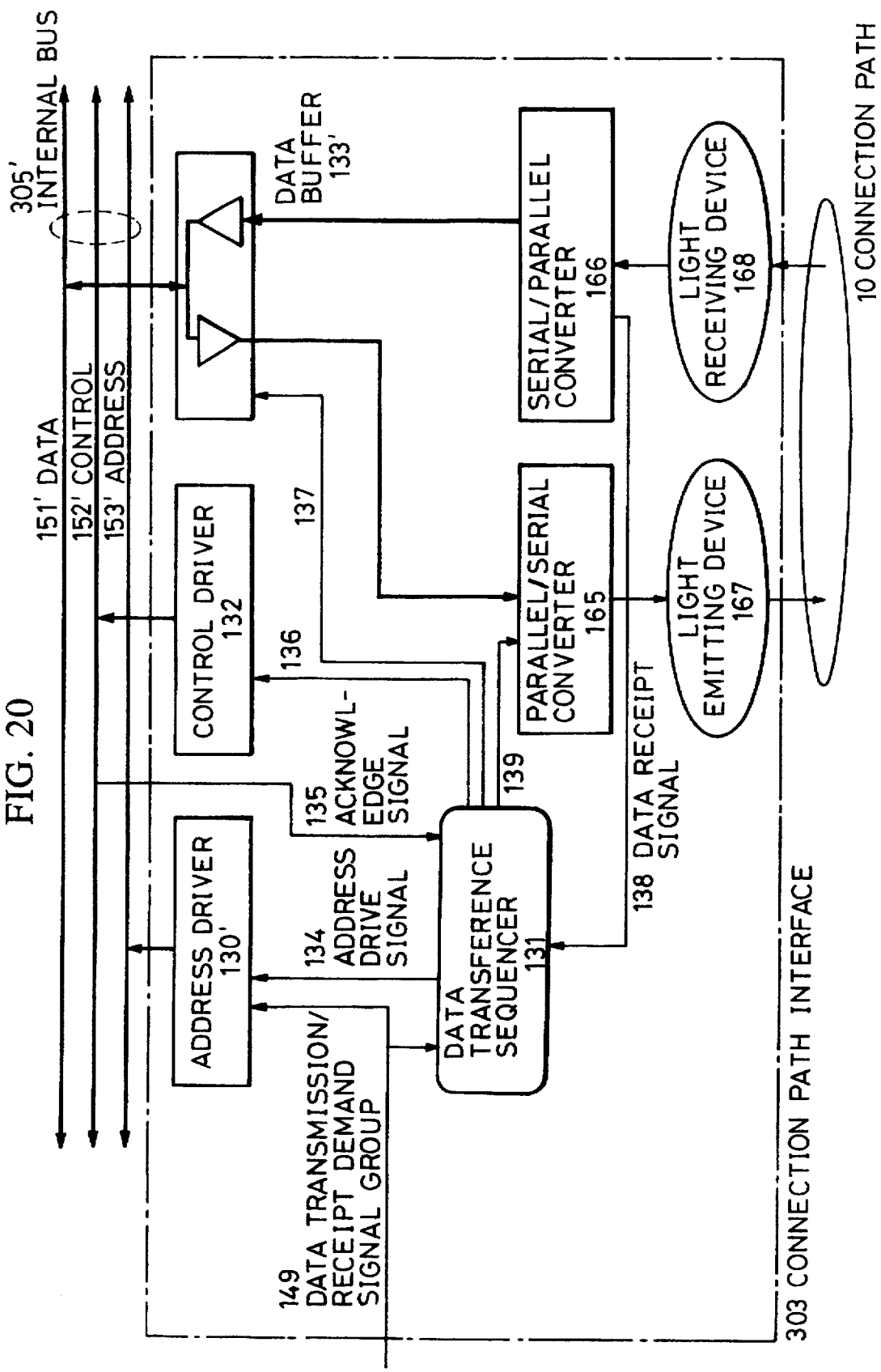
FIG. 20 is a diagram showing the structure of a connection path interface portion according to the third embodiment of the present invention.

FIG. 20 shows an example of the connection path interface portion 303'. The data transmission/receipt demand signal group 149 supplied from the arbiter interface acts to instruct the address driver 130' to drive address 41000000h and to demand the data transference sequencer 131 to make invalid the synchronization flag. Specifically, storing of dummy data of address 41000000h on the internal bus 305' is instructed in the foregoing case.

The sequencer 131 transmits a signal 134 to instruct the address driver 130' to drive address 41000000h, and then it instructs, through a signal line 136, the control driver 132 to drive, to the bus, the transference size and the control signal for performing the storing command. Then, the sequencer 131 instructs, through a signal line 137, a data buffer 133' to drive dummy data on to the bus.

The CPU 301' in the node 300', that has monitored the dummy data storing process as the [SS] function, checks the reserve flag thereof and the register having the address at which the flag is set. Since the addresses coincide with each other in this embodiment, the reserve flag is made invalid.

Since no subject address exists in the memory 302', the storing process is ignored. In order to prevent the loss of bus time, the data transference sequencer 131 instructs the control driver 132' to drive the acknowledge signal after a predetermined delay. A similar operation is performed in the node 400'.

The sequential operations in the nodes 300' and 400' may be defined as address only transactions in a system comprising a CPU that controls independently the address bus and the data bus. In the foregoing case, it can be realized in such a manner that the process for making invalid the reserve flag is completed in only the address phase without the driving of dummy data on to the bus.

In the node 200', which is the correct node to which data is transferred, the transference is performed as disclosed in U.S. Appln. Ser. No. 08/341,877 so that the data storing process is performed. At this time, the [SS] function is performed similarly to the operation in the node 300' such that the synchronization flag of the CPU is checked and the synchronization operation is realized.

As a result, CPUs can be synchronized when the [SC] command is performed in the node 100'.

A similar process is performed among the other nodes.

Although this embodiment has the structure in which light having the wavelength of λ1 is used for the light signals on the arbitration signal paths 110, 210, 310 and 410 shown in FIG. 13 and wavelengths λ2 and λ3 (λ2 and λ3 are different wavelengths) are used as the light signal on the connection path 10', a structure in which λ1 =λ2 and λ1 =λ3 may be employed.

In a case of the synchronization command to data in the memory of the node 100', specifically, in a case where the CPU 101' in the node 100' loads data (four bytes) of address "41000000h" in the RAM 102' of the node 100' by using the [LR] command and changes the same by issuing the [SC] command, synchronization to be performed will now be described.

Referring to FIG. 15, the external access detection signal 144' is not activated but the writing demand detection signal 150 and the storing demand detection signal 181' cause control to be passed to the program, which is operated by the node arbitration control processor 141'. Simultaneously, address data, transmitted to the address signal line 153' at this time, is latched to the address latch register 142', and control information, such as the number of bytes (four bytes) to be transferred, is latched to the control-signal latch register 143'.

Figure 21:
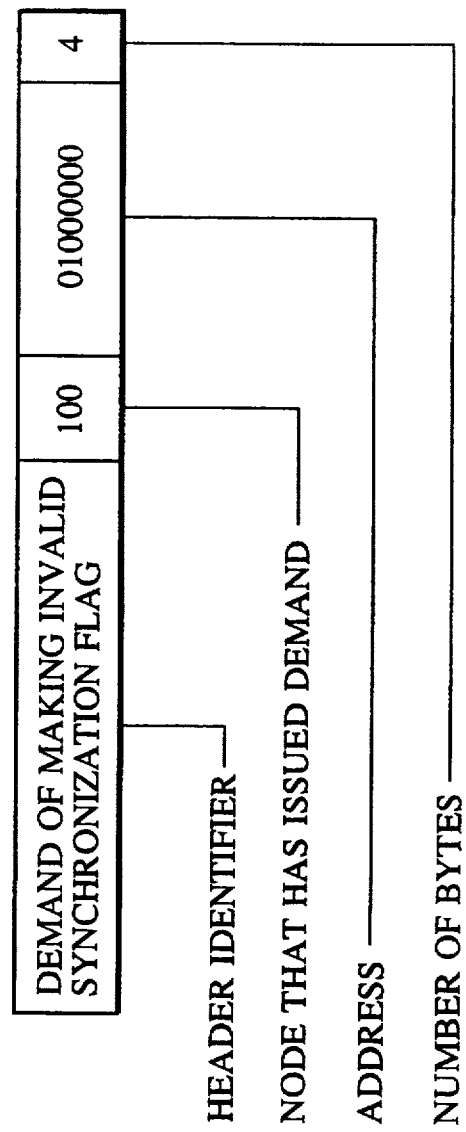
FIG. 21 is a diagram showing the structure of a synchronization maintenance request packet.

The node arbitration control processor 141' reads signals latched by the address latch register 142' and the control-signal latch register 143 so as to make a synchronization maintenance request packet as shown in FIG. 21 to write it on the parallel/serial converter 161. The parallel/serial converter 161 converts written information into serial data to transmit the serial data to the light emitting device 163. The light emitting device 163 photoelectrically converts the supplied signal to transmit it, as a light signal having a wavelength of λ1, to the arbiter 20 through the communication path 110 comprising an optical fiber.

Referring to FIG. 17A and FIG.17B when a synchronization maintenance request packet has been supplied from the node 100' and the same has been received by the serial/parallel converter 611, the serial/parallel converter 611 converts the supplied electric signal into a parallel signal and transmits a data receipt detection signal 622 to the packet information administration apparatus 21 to indicate this.

When the packet information administration apparatus 21 has received the data receipt detection signal 622, the packet information administration apparatus 21 transmits the device selection signal 619 to select the serial/parallel converter 611 to read, from the internal bus, the synchronization maintenance request packet transmitted from the node 100 through the data bus 620. Then, information in the packet about the address, the number of bytes to be transferred and the number of the node that has issued the demand is stored in the portion of the microcontroller that serves as the synchronization information administration apparatus 24.

The synchronization information administration apparatus 24 synchronizes the CPUs by making packets for making invalid the reserve flag as shown in FIG. 19 in accordance with information supplied to the synchronization information administration apparatus 24 in order to instruct the nodes 200', 300' and 400' to make invalid reserve flags with respect to data at address 01000000h if the reserve flag has been set to sequentially write the packets in the parallel/serial converters 614, 616 and 618.

Since the following operation is the same as that of the foregoing embodiment, its description is omitted.

Although each of the foregoing embodiments has the structure that the arbitration signal paths 110, 210, 310 and 410 and the connection path 10' shown in FIG. 13 are physically independent paths, a structure physically passing through the same path may be employed if the foregoing lines can be logically separated.

However, in order to prevent radio interference at the time of the multiplexing of the wavelengths, λ1, λ2 and λ3 must be different wavelengths.

Fourth Embodiment

In the foregoing embodiments, the invalidation process for synchronizing CPUs in different nodes is realized in such a manner that the processing demand from the arbiter in each node is performed as a dummy writing process.

However, by improving the performance of the synchronization realizing apparatus in each node, synchronization of CPUs in different nodes can be realized more efficiently.

An example of the foregoing case will now be described with reference to FIG. 22.

Figure 22:
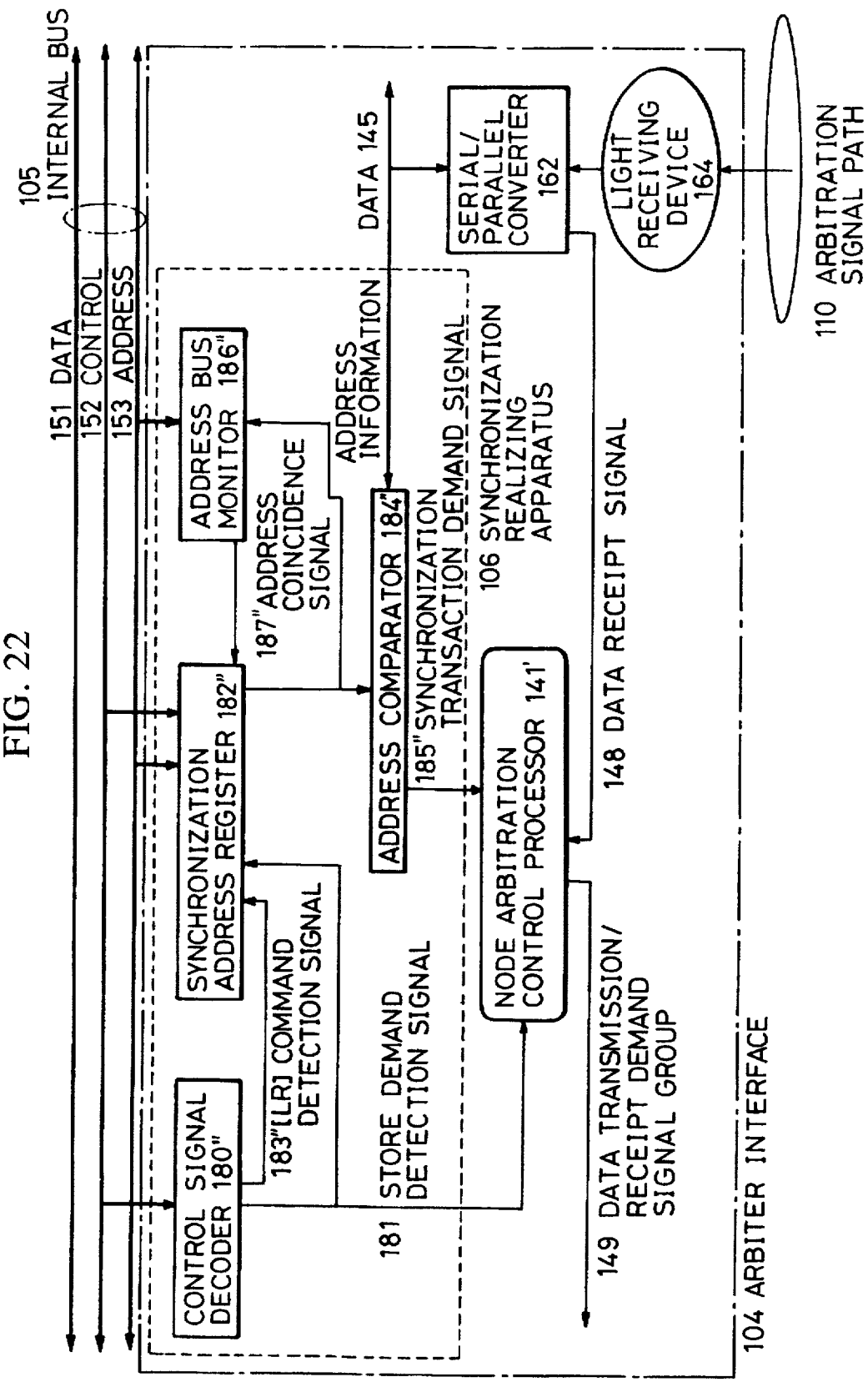
FIG. 22 is a diagram partially showing the structure of a synchronization realizing apparatus and that of an arbiter interface.

FIG. 22 is a diagram showing the structure of a synchronization realizing apparatus and a portion of an arbiter interface circuit. The node 100" is taken as an example, and the reference numerals in FIG. 22 are the same as those of the foregoing embodiments for the same elements.

The synchronization realizing apparatus 106 comprises the control-signal decoder 180", the storing demand detection signal 181 shown in FIG. 15, the synchronization address register 182", the [LR] command detection signal 183", the address comparator 184", and the synchronization transaction demand signal 185".

The control-signal decoder 180" constantly monitors the control signal line 152'. If the control-signal decoder 180" has recognized generation of a [LR] command on the bus, it transmits the [LR] command detection signal 18341 to notify the synchronization address register 182". The synchronization address register 182", that has been notified by the signal 183", stores the address at which the [LR] command is passing on the bus, and the number of the CPU that is performing the bus transaction.

The address registered in the synchronization address register 182" is supplied to the address bus monitor 186" and the address comparator 184". If the address bus monitor 186" has detected, on the bus, the same address as that supplied from the synchronization address register 182", it drives the address coincidence signal 187" to the synchronization address register 182". If simultaneous driving of the address coincidence signal 187" and the storing demand detection signal 181 has been detected, the synchronization address register 182" clears the address stored therein.

The node arbitration control processor 141', that has detected receipt of the packet for making invalid the reserve flag from the arbiter, supplies, to the address comparator 184", the address indicated in the packet supplied from the arbiter 20. The address comparator 184" checks whether or not the foregoing address and the address stored in the synchronization address register 182" coincide with each other. If the two addresses coincide with each other, then a CPU has issued the [LR] command to the address inside of the subject node and that has the reserve flag, and therefore the process for making invalid the flag must be performed. Only in the foregoing case is the synchronization transaction demand signal 185" driven to the arbitration processor 141'. The arbitration processor 141', which has received the foregoing signal, performs the foregoing process for synchronizing the CPUs.

As a result, the generation of undesirable bus transactions in the node can be prevented and thus the CPUs can be synchronized over nodes more efficiently.

As described above, the present invention is characterized by an information processing system having a plurality of nodes each including an internal bus and a processor that monitors the internal bus to detect information required to perform a synchronized operation and perform the synchronized operation with other processors in accordance with the information. The information processing system comprises: a connection path that is capable of simultaneously connecting a plurality of the nodes to one another, arbitration means for arbitrating demands for using the connection path, arbitration signal paths for respectively connecting the arbitration means and the nodes, transmission means for transmitting at least a portion or all of the information required to perform the synchronized operation in the node and among the nodes from the nodes to the arbitration means through the arbitration signal path, and re-distribution means for redistributing the portion or all the information from the arbitration means to each node through the arbitration signal path in accordance with the information transmitted from the node by the transmission means, wherein the information distributed to each node by the distribution means is reflected on the internal bus in each node so that the synchronized operation among the processors in the different nodes is realized.

Fifth Embodiment

In the foregoing embodiments, the arbiter for realizing synchronization of CPUs over nodes sequentially transmits packet data to the nodes. Therefore, if the number of nodes increases, the process in the arbiter is delayed and thus the overall performance of the network can deteriorate. What is worse, in a case where the arbitration signal path is used to transmit another signal for demanding use, the arbitration signal path cannot be used to realize the synchronization process until the other use of the path is completed and the performance deteriorates due to the delay.

An object of a fifth embodiment is to provide an information processing system and a method therefor that is capable of, at high speed, realizing synchronization among CPUs in different nodes.

The fifth embodiment of the present invention will now be described in detail.

Figure 23A:
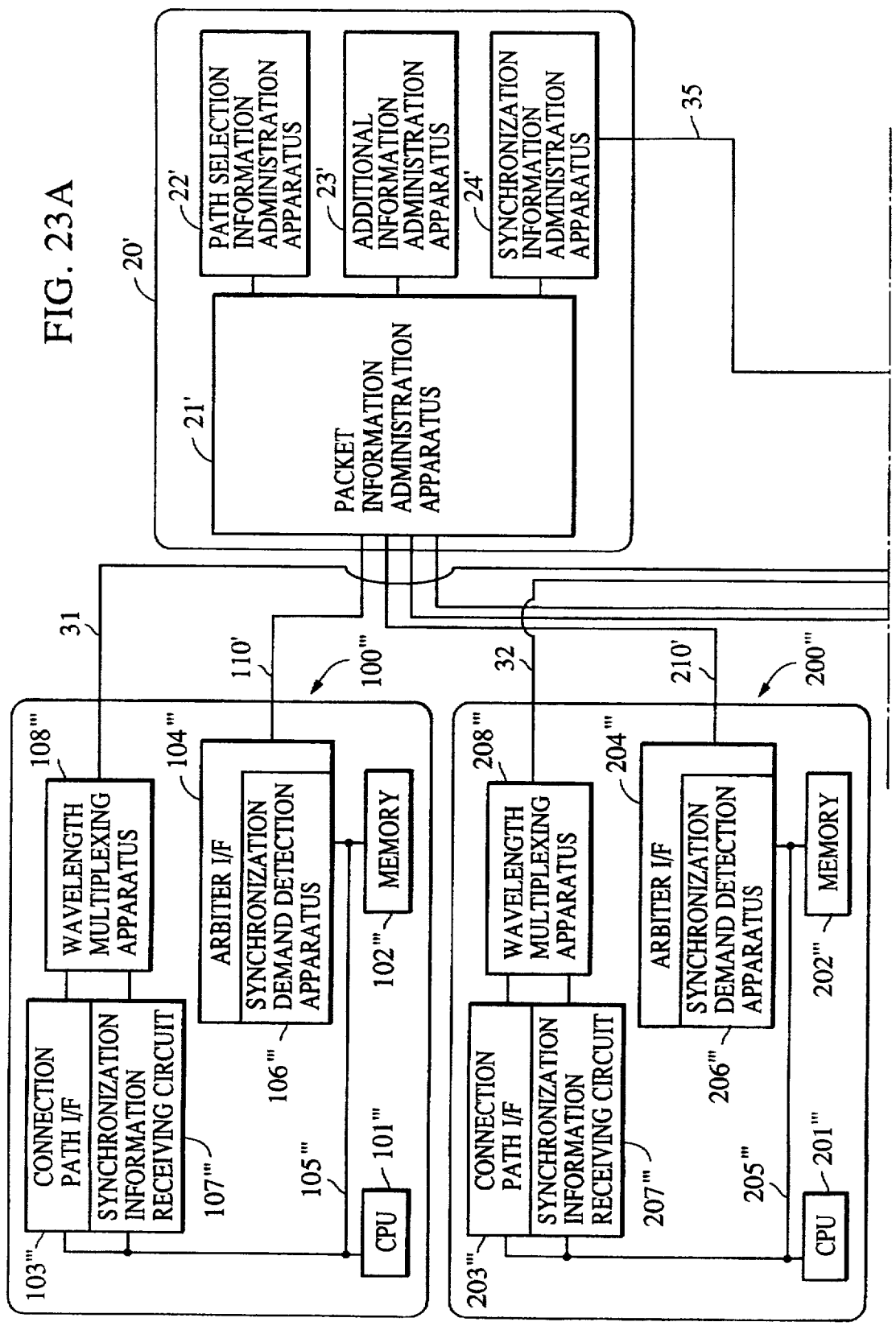
FIG. 23, consisting of FIGS. 23A and 23B, is a block diagram showing the structure of a system according to a fifth embodiment of the present invention.

FIG. 23 is a block diagram showing the structure of the system according to the fifth embodiment of the present invention.

Referring to FIG. 23, reference numerals 100''', 200''' 300''' and 400''' represent nodes that are connected mutually by paired optical fiber cables 31, 32, 33 and 34. A concentrator 30 includes a star coupler 50 for redistributing a signal supplied through a connection path composed of the optical fibers 31, 32, 33 and 34.

The nodes include CPUs 101''', 201 ''', 301''' and 401''' memories 102''', 202''', 302''' and 402''', connection path interface (I/F) circuits 103 ''', 203''', 303''' and 403''' for establishing the connections between a connection path, which is composed of optical fibers 31, 32, 33 and 34, and inside portions of the nodes, arbitration interface (I/F) circuits 104''', 204''', 304''' and 404''' for demanding use of the connection path composed of optical fibers 31, 32, 33 and 34, internal buses 105''', 205''', 305''' and 405''' for mutually connecting the foregoing elements, synchronization information receiving circuits 107''', 207''', 307''', and 407''', and wavelength multiplexing apparatuses 108, 208, 308 and 408'''. The arbitration interface circuits 104''', 204''' 304''' and 404''' respectively include synchronization demand detection apparatuses 106''', 206'''306''' and 406''' for detecting and notifying synchronization demands.

The arbiter 20' arbitrates use of the connection path composed of the optical fibers 31, 32, 33 and 34, the arbiter 20' being connected to each node by the arbitration signal paths 110', 210', 310' and 410'.

The arbiter 20' includes the packet information administration apparatus 21' for administrating packet data supplied from each node, the path selection information administration apparatus 22' for administrating path demand information contained in the packet data, the additional-information administration apparatus 23' for temporarily storing additional information generated at the time of transferring data, such as address data, following the foregoing information, and the synchronization information administration apparatus 24' for temporarily storing information required to realize the mechanism for synchronizing CPUs in the packet and perform control to redistribute synchronization control information to each node. The synchronization information administration apparatus 24' is connected to the star coupler 50 of the concentrator 30 through the synchronization information notifying light signal path 35.

In the system according to this embodiment structured as shown in FIG. 23, the arbiter 20' centralling administrates synchronization information and broadcasts information to each node so that CPUs can be synchronized over nodes even where mutual bus monitoring cannot be performed.

Specifically, the operation for synchronizing the CPUs will now be described in a case where the CPU 101 in the node 100''' and the CPU 301''' in the node 300''' intend to synchronize data in the memory 202''' in the node 200 '''.

As in the third embodiment, FIG. 14 shows the overall memory address space of the system according to this embodiment. In this embodiment, the overall address space (four giga bytes) of the system is assigned to four nodes.

As shown in FIG. 14, the memory space in the node 100''' is from address "00000000h" to address "3fffffffh", while the memory space in the node 200''' is from address "40000000h" to address "7fffffffh". The memory space is similarly assigned to each node.

When the CPU 101 in the node 100 loads data (four bytes) at address "41000000h" (h indicates a hexadecimal number) in the memory 202''' in the node 200''' by using the [LR] command, the reserve flag in the CPU 101''' is set. Accordingly, a case will now be considered in which the [SC] command is issued so that the reserve flag is off. Note that data at address "41000000h" in the memory in the node 200''' is loaded into the CPU 101''' in the node 100''' by reading data between nodes.

An assumption is made that also the CPU 301''' in the node 300''' has loaded data (four bytes) at address "41000000h" in the memory 202 in the node 200 by using the LR command and thus the reserve flag in the CPU 301 has been set.

For the fifth embodiment, reference will be made to FIGS. 15 and 16, using the reference numerals therein. FIG. 15 is a block diagram showing the structure of the arbiter interface (I/F) 104' in the node 100'. The arbiter interfaces in the other nodes have similar structures.

Referring to FIG. 15, the address decoder 140' constantly monitors the internal bus 105' (that includes the data signal line 151', the control signal line 152' and the address signal line 153') in the node 100'. If the address decoder 140' recognizes the generation of an access (the operation of writing from address "41000000h") to an external node (the node 200' in the foregoing case) on the bus 105', the address decoder 140' transmits the external access detection signal 144' and the writing demand detection signal 150 to pass control to the program that is operated in the node arbitration control processor 141'. Simultaneously, the address transmitted on to the address signal line 153' at this time is latched to the address latch register 142'. The type of the demand, e.g. whether it is a reading demand or a writing demand (it is the writing demand in this case), is latched by the control-signal latch register 143'. Furthermore, control information, such as the number of bytes (four bytes) to be transferred, is latched to the control-signal latch register 143'.

Although the node arbitration control processor 141' according to this embodiment comprises a one-chip microcontroller, the structure of the same is not limited to that according to this embodiment. For example, it may be composed of hardware logic.

Simultaneously, the control-signal decoder 180' included in the synchronization demand detection apparatus 106' of the arbiter interface 104' constantly monitors the control signal line 152' in the internal bus 105'. If the control-signal decoder 180' has recognized the generation of a storing command (a [SC] command to address "41000000h" in the node 200' in the foregoing case) on the bus 105', the control-signal decoder 180' transmits the storing demand detection signal 181' to notify the control program in the node arbitration control processor 141' that the synchronization control is required.

The node arbitration control processor 141', to which the external access detection signal 144', the writing demand detection signal 150 and the storing demand detection signal 181' have been supplied, reads signals latched by the address latch register 142' and the control-signal latch register 143' to discriminate the connected unit. Thus, the node arbitration control processor 141' makes arbitration request packet data, for example, as shown in FIG. 16, and writes the packet data on the parallel/serial converter 161.

Packet data shown in FIG. 16 is a path demand signal and includes information for notifying the synchronization control demand to the arbiter 20.

Referring to FIG. 16, reference numeral 411 represents a header identifier which indicates a path demand and as well as a synchronization demand in this case. Reference numeral 412 represents the number of the node (it is "100'" in this case), that has issued the demand, and 413 represents No. of the connected node (it is "200'" in this case). Reference numeral 414 represents the address that transmits the access demand (it is "41000000h"), and 415 represents information about the type of transference, that is writing in this case. Reference numeral 416 represents the number of bytes (it is "four" in this case).

The parallel/serial converter 161, to which the foregoing packet data has been set, converts written information into serial data to transmit the serial data to the light emitting device 163. The light emitting device 163 photoelectrically converts the supplied signal into a light signal having a wavelength of λ1 to transmit it to the arbiter 20 through the communication path 110 comprising the optical fiber. Note that the foregoing structure is common to all nodes, and the light emitting device 163 is an LED or a semiconductor laser device and the light receiving device 164 is a photoelectrical conversion device typified by a photodiode.

Figure 24A:
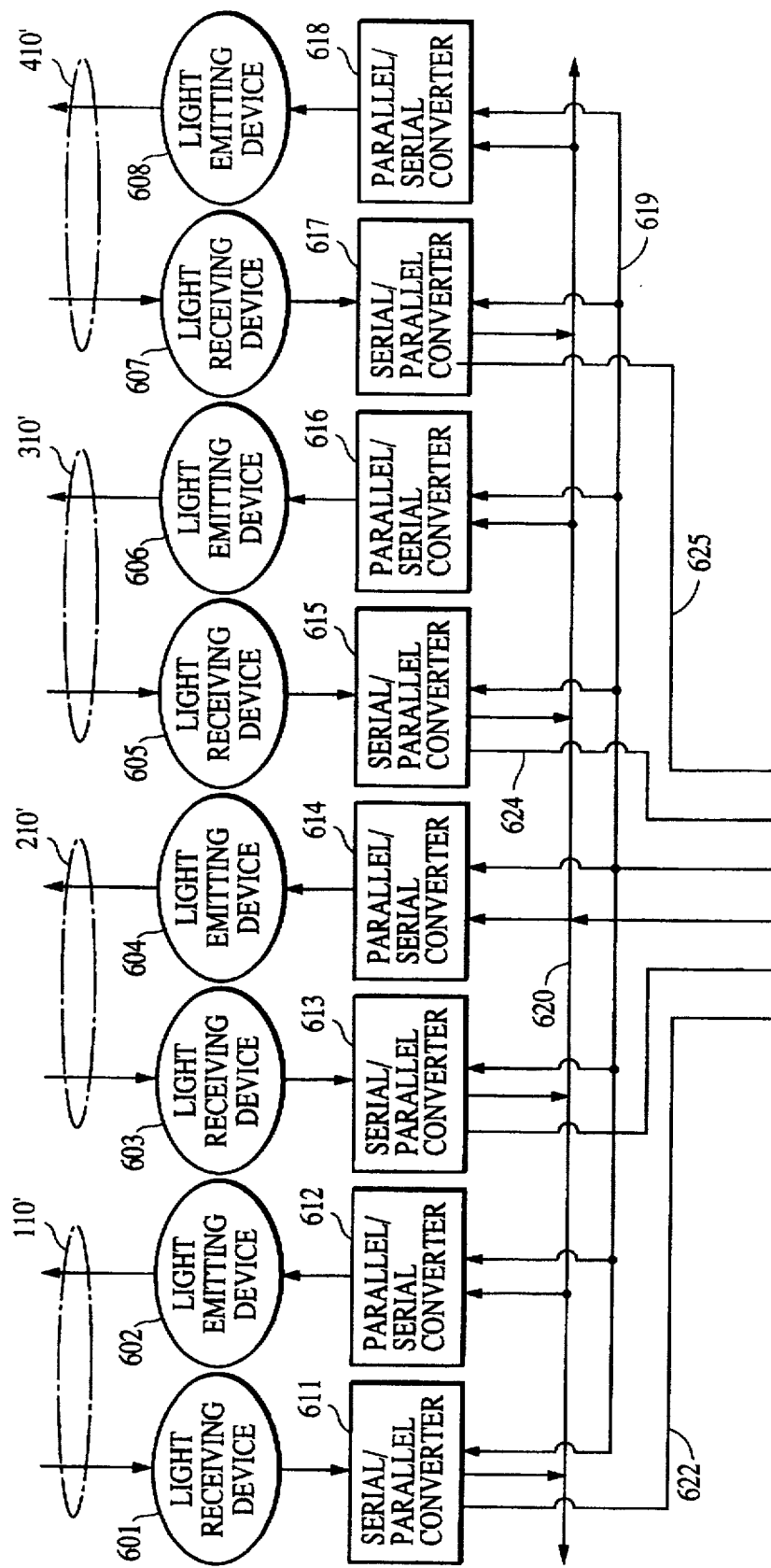
FIG. 24, consisting of FIGS. 24A and 24B, is a block diagram showing the structure of an arbiter according to a fifth embodiment.
Figures 24, 24B:
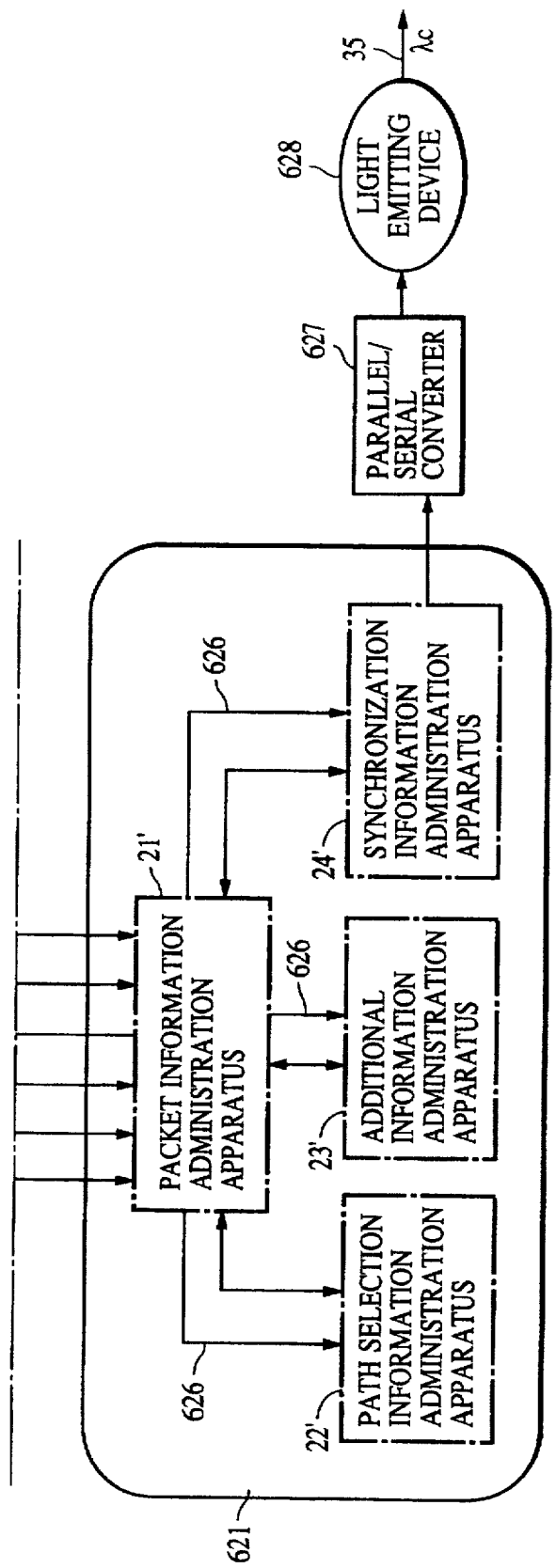

FIG. 24 is a block diagram showing the structure of the arbiter 20' according to the fifth embodiment.

Referring to FIG. 24, reference numerals 601, 603, 605 and 607 represent light receiving devices that respectively receive light signals transmitted by the corresponding nodes and each having a wavelength of λ1, that is, arbitration request signals, to convert the signals into electric signals. If a request signal from the node 100'" has reached, it is received by the serial/parallel converter 611. The serial/parallel converter 611 converts the supplied serial electric signal into a parallel signal and simultaneously transmits the data receipt detection signal 622 to notify the packet information administration apparatus 21'. In this embodiment, the packet information administration apparatus 21' comprises a microcontroller 621 having a ROM storing a program and a RAM for use in performing the process. The microcontroller 621 includes portions that serve as the path selection information administration apparatus 22', the additional-information administration apparatus 23' and the synchronization control information administration apparatus 24'.

When the packet information administration apparatus 21' has received the data receipt detection signal 622, the packet information administration apparatus 21' transmits the device selection signal 619 to select the serial/parallel converter 611 to read, from the internal register through the data bus 620, the request packet transmitted by the node 100'". Information 412 about the node that has issued the demand and information 413 (see FIG. 16) about the number of the connected node are included among information in the request packet and are sent to the path selection information administration apparatus 22'. A portion of additional information relating to the data transference is stored in the portion of the microcontroller 621 that serves as the additional-information administration apparatus 23'. If a discrimination has been performed that the foregoing packet is used when the operation for synchronizing the CPUs is performed, the operation for synchronizing CPUs over the nodes is required. Therefore, address 414 of the request packet, information 412 about the number of the node that has issued the demand, and the like are stored in the portion that serves as the synchronization control information administration apparatus 24'.

Figure 18:
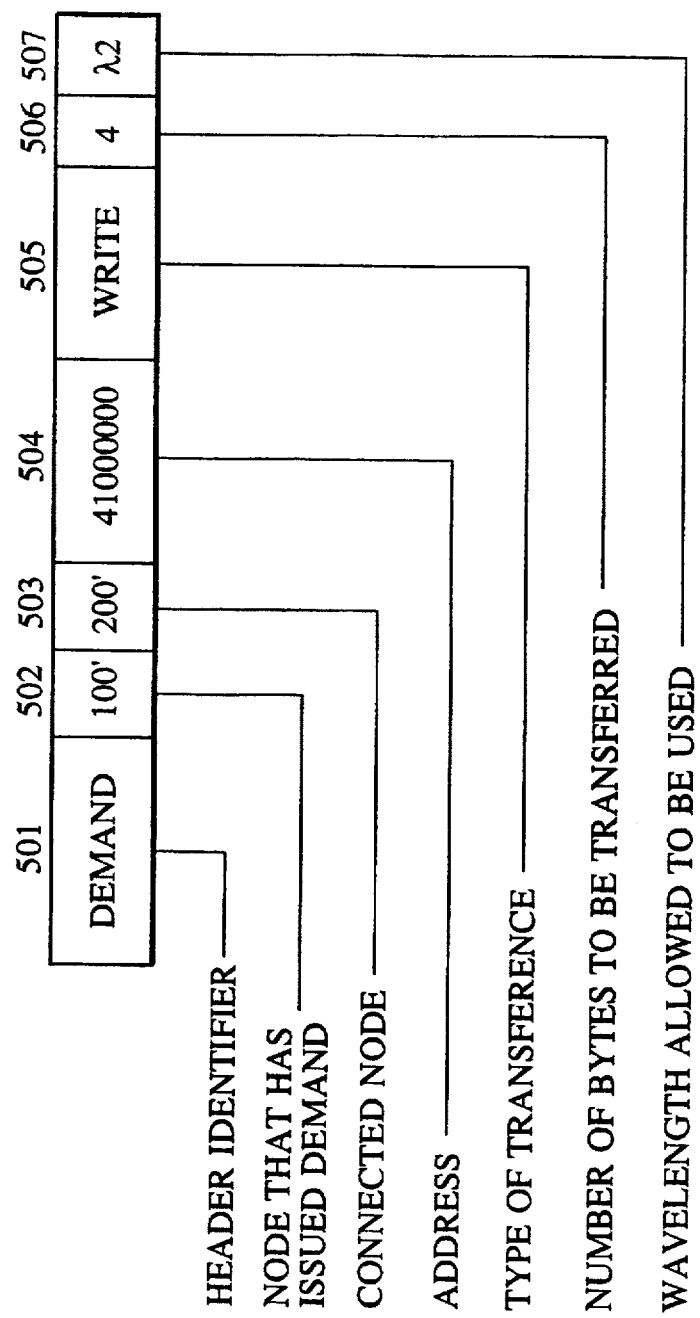
FIG. 18 is a diagram showing the structure of a packet for demanding preparation of a connection.

The path selection information administration apparatus 22' analyzes received data to recognize that the demand to use the foregoing path is a demand from the node 100'" to establish the connection with the node 200'". Furthermore, the path selection information administration apparatus 22' checks the flag indicating the state of use of the path prepared for the path selection information administration apparatus 22' and the wavelength that is being used. If the path can be used, the flag is set to the state where the path is being used. Then, the packet for demanding connection preparation shown in FIG. 18 is made so as to be written on the parallel/serial converters 612 (for the node 100'") and 614 (for the node 200'"). The packet for demanding connection preparation as well as includes information supplied from the portion of the microcontroller 621 that serves as the additional-information administration apparatus 23 and information about the wavelength.

Referring back to FIG. 18, reference numeral 501 represents a header identifier indicating the packet for demanding to prepare connection, 502 represents the number of the node (it is "100" in this case), that has issued the demand, 503 represents the number of the connected node (it is "200" in this case), 504 represents address (it is "41000000h" in this case), 505 represents the type of transference ("writing"), 506 represents the number of bytes to be transferred ("four"), and 507 represents the allowed wavelength (λ2 in this case) of the light signal.

The packets for demanding connection preparation set to the two parallel/serial converters are transmitted to nodes 100'" and 200'" by light signals each having the wavelength λ1 similarly to the case of the light arbiter interface. Note that the four nodes use different wavelengths λ2 and λ3 for the purpose of performing data communication so that two systems of communication are performed between two nodes.

If the nodes 300'" and 400'" have set reserve flags to correspond to address "41000000h", the synchronization control information administration apparatus 24' instructs the nodes 300'" and 400'" to turn the reserve flag off in accordance with information supplied to the synchronization control information administration apparatus 24' for the purpose of synchronizing the CPUs over the nodes. Therefore, the synchronization control information administration apparatus 24' makes the packets for making invalid the synchronization flag as shown in FIG. 25 so as to write the packets on the parallel/serial converter 627.

Referring to FIG. 25, reference numeral 701 represents a header identifier, which is an identifier for making invalid the synchronization flag. Reference numeral 702 represents the number of the node ("100" in this case) that has issued the demand, 703 represents the demand address (it is "41000000h" in this case) and 704 represents the number of bytes (it is "four" in this case) to be transferred.

Packet data written on the parallel/serial converter 627 is in the form of a light signal having a wavelength λc, transmitted to the synchronization information notifying light signal path 35 through the light emitting device 628 so as to be received by the star coupler 50 in the concentrator 30. The light signal having the wavelength of λc is made to be different from wavelengths λ2 and λ3 for use in the data transference in order to prevent radio interference with the wavelengths λ2 and λ3. The packet for making invalid the synchronization flag (see FIG. 25) supplied to the star coupler 50 is uniformly divided for the respective nodes so as to be transmitted to the nodes through the optical fibers 31, 32, 33 and 34.

The operation to turn the reserve flag off (invalid) in order to synchronize CPUs in the nodes 300'" and 400'" will now be described while taking the operation in the node 300'" as an example.

Figure 26:
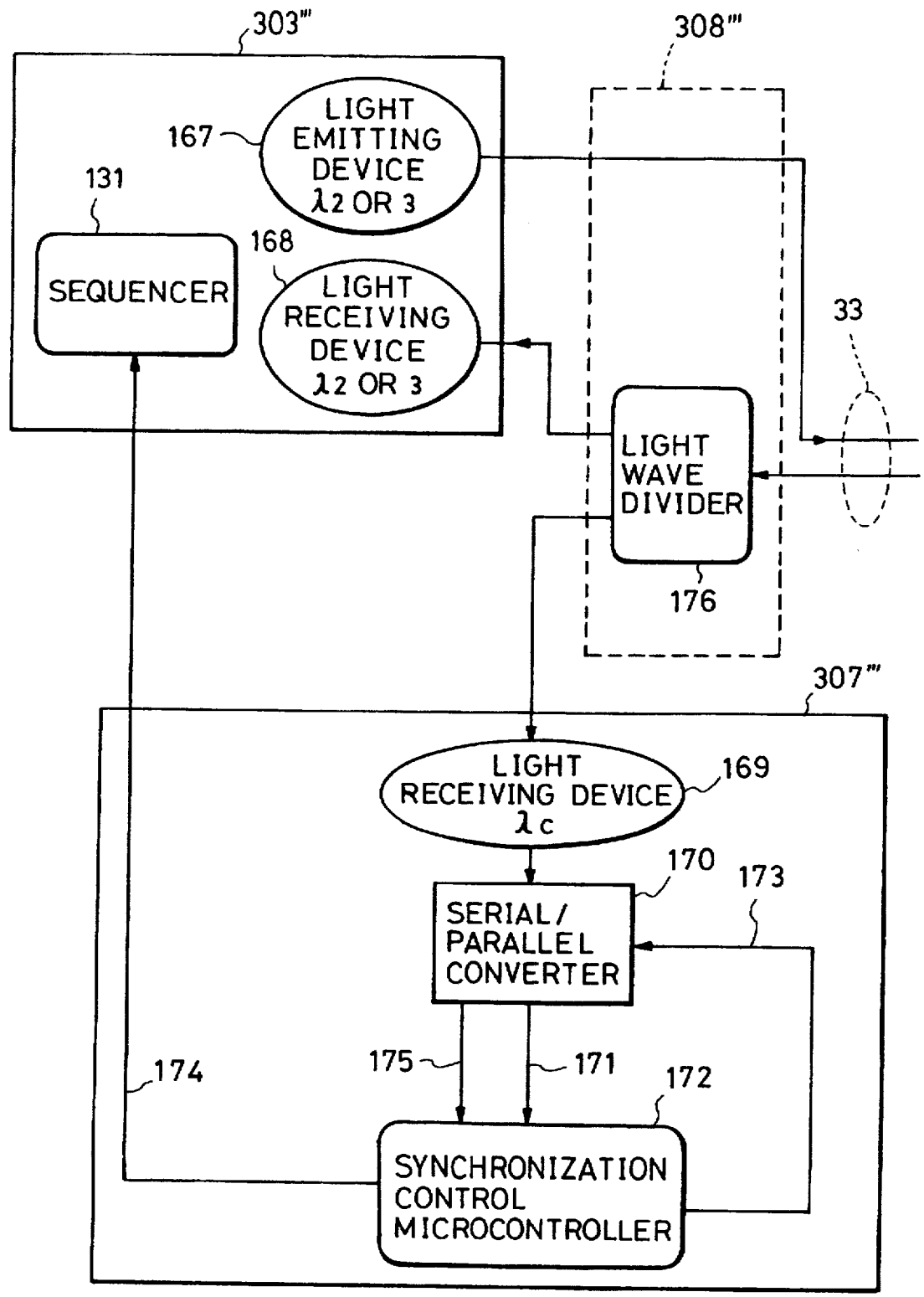
FIG. 26 is a block diagram showing the structure of a synchronization information receiving circuit and a light multiplexing process according to the fifth embodiment of the present invention.

FIG. 26 is a block diagram showing the structure of the synchronization information receiving circuit 307'" and the wavelength multiplexing apparatus 308'" in the node 300'"

The light signal supplied from the optical fiber 33 to the node 300'" is, by a light wave divider 176, divided into light (λ2 or λ3) passing toward the connection path interface 303'" and light (λc) passing toward the synchronization information receiving circuit 307'". Light having the wavelength λc received by the synchronization information receiving circuit 307'" is converted into an electric signal by the light receiving device 169, followed by being converted into a parallel signal by the serial/parallel converter 170. Simultaneously, the synchronization maintenance packet receipt signal 171 is transmitted to notify the synchronization control microcontroller 172. When the notification has been detected, the synchronization control microcontroller 172 in the node 300'" uses the device selection signal 173 and the data bus 175 with respect to the serial/parallel converter 170 to read the packets for making invalid the synchronization flag shown in FIG. 25 so as to demand the CPU 301'" in the node 300 to allow use of the internal bus 305'".

If the synchronization control microcontroller 172 is allowed to use the internal bus 305, the synchronization control microcontroller 172 uses the synchronization maintenance demand signal group 174 to instruct the connection path interface 303 to transmit, on to the internal bus 305, bus access to make invalid the reserve flag set by the CPU in relation to address "41000000h" in accordance with the contents of the packet shown in FIG. 25.

Figure 27:
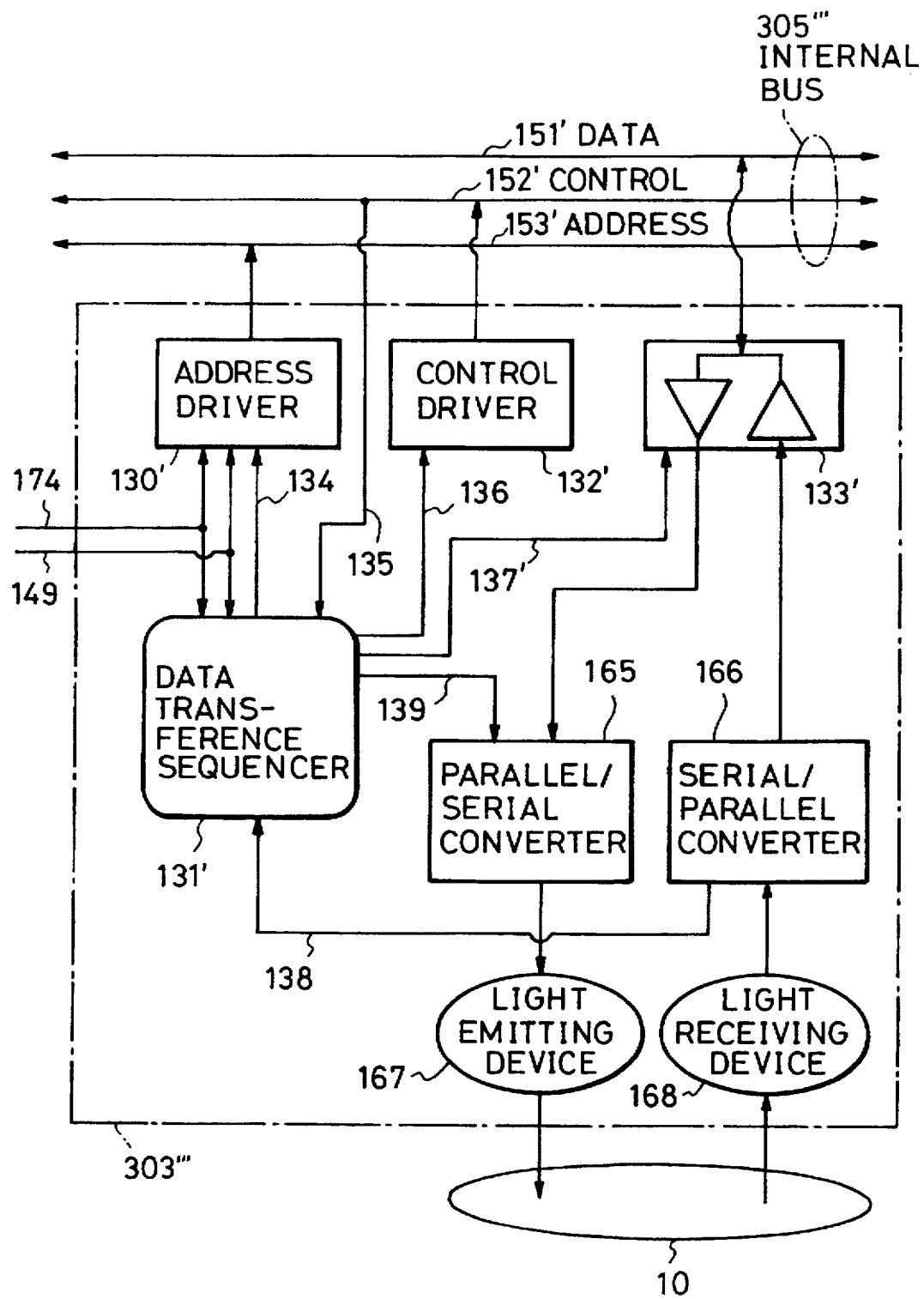
FIG. 27 is a block diagram showing the structure of a connection path interface circuit according to the fifth embodiment of the present invention.

FIG. 27 is a block diagram showing an example of the connection path interface portion 303'" in the node 300'". The synchronization maintenance demand signal group 174 transmitted by the synchronization control microcontroller 172 is used to cause the address driver 130' to drive address "41000000h" and the data transference sequencer 131' to make invalid the synchronization flag. Specifically, a command to store dummy data of address "41000000h" is sent to the internal bus 305'".

The sequencer 131' transmits the address drive signal 134 to instruct the address driver 130' to drive address "41000000h". Then, the sequencer 131', through the signal line 136, instructs the control driver 132' to drive, on the bus, the transference size and the control signal for performing the storing command. Furthermore, the sequencer 131', through the signal line 137, instructs the data buffer 133' to drive dummy data on to the bus 305'".

The CPU 301'" in the node 300'", that has monitored the dummy data storing process by using the [SS] function, checks the reserve flag of the CPU 301'" and the register having the address at which the foregoing flag has been set. Since the addresses coincide with each other in this embodiment, the reserve flag is turned off (made invalid).

Since no address corresponding to address "41000000h" exists in the memory 302'", the foregoing storing process is ignored. To prevent the less of bus time, the data transference sequencer 131 instructs the control driver 132' to drive the acknowledge signal after a predetermined delay. Note that a similar operation is performed in the node 400'".

The foregoing sequential operations to be performed in the nodes 300'" and 400'" may be defined as address only transactions in a system comprising a CPU of a type in which the address bus and the data bus are controlled independently. In the foregoing case, the process for turning off the reserve flag can be completed by the address phase process without driving the dummy data on the bus.

In the node 200'", which is the correct node to which data must be transferred, storing of data is performed. At this time, the [SS] function is performed similarly to the operation in the node 300'". Thus, the reserve flag of the CPU is checked and synchronization is performed.

As a result, the CPUs can be synchronized by performing the [SC] command in the node 100'". A similar process is performed in the transference among other nodes.

The node 100'", that issued the demand, receives the packets for making invalid the synchronization flag shown in FIG. 25 to interpret the contents of the packet. When the node 100'" detects the node number thereof in the field in the packet which indicates the node that issued the demand, the following process to be performed with the packet is interrupted.

Although this embodiment has a structure in which light having the wavelength λ1 is used for the light signals on the arbitration signal paths 110', 210', 310' and 410' shown in FIG. 23 and wavelengths λ2 and λ3 (λ2 and λ3 are different wavelengths) are used for the light signals on the connection paths 31, 32, 33 and 34, a structure in which λ1=λ2 and λ1=λ3 may be employed.

In the case of the command to synchronize data in the memory in the subject node, specifically, in the case where the CPU 101'" in the node 100'" has loaded data (four bytes) at address "01000000h" in the memory in the node 100'" that can be used in the synchronization command by using the [LR] command and the CPU 101'" intends to change it by issuing the [SC] command, the synchronization is realized as follows:

Referring back to FIG. 15, in this case the external access detection signal 144' does not react, but the writing demand detection signal 150 and the storing demand detection signal 181' are used to pass control to the program that is operated in the node arbitration control processor 141'. Simultaneously, address data transmitted to the address signal line 153' at this time is latched by the address latch register 142', while control information, such as the number of bytes (four bytes) to be transferred, is latched by the control-signal latch register 143'.

Figure 28:
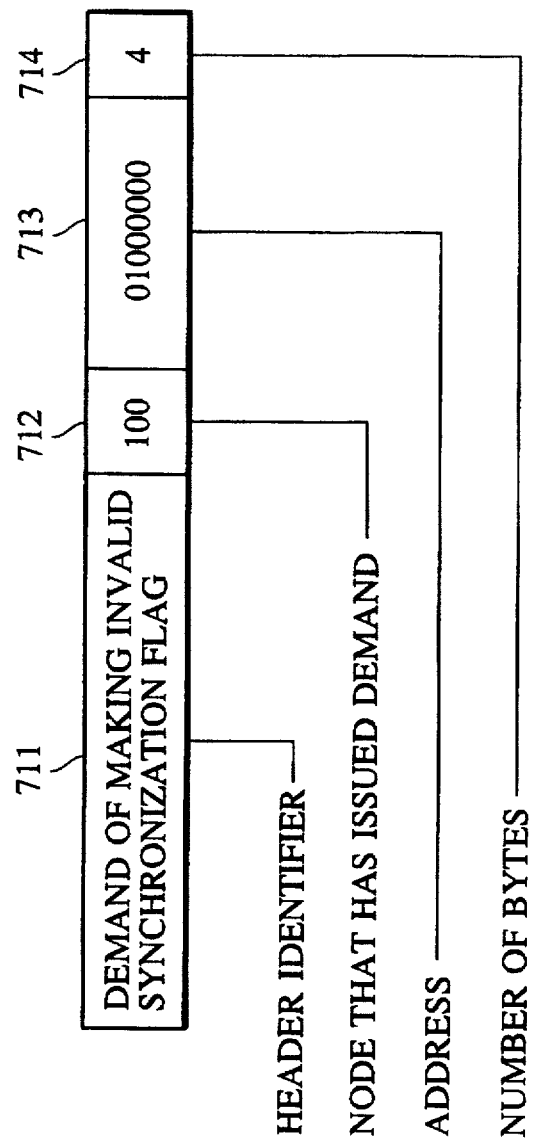
FIG. 28 is a diagram showing the structure of data in a synchronization maintenance request packet for use in the fifth embodiment of the present invention.

The node arbitration control processor 141' reads signals latched by the address latch register 142' and the control-signal latch register 143 to make a synchronization maintenance request packet as shown in FIG. 28 so as to write it in the parallel/serial converter 161.

FIG. 28 shows an example of the synchronization maintenance request packet data, in which reference numeral 711 represents a header identifier indicating the demand for making invalid the synchronization flag, 712 represents the node number ("100'"" in this case) that has issued the demand, 713 represents the demanded address ("01000000h" in this case), and 714 represents the number of bytes ("four" in this case) to be transferred.

The parallel/serial converter 161 converts written information into serial data and transmits the serial data to the light emitting device 163. The light emitting device 163 photoelectrically converts the supplied signal to transmit it in the form of a light signal having a wavelength λ1 to the arbiter 20 through the communication path 110 comprising the optical fibers.

Referring to FIG. 24, the synchronization maintenance request packet comes from the node 100'" so as to be supplied to the serial/parallel converter 611. In the serial/parallel converter 611, the supplied serial electric signal is converted into a parallel signal. Simultaneously, the data receipt detection signal 622 is transmitted to notify the packet information administration apparatus 21' in the microcontroller 621.

When the packet information administration apparatus 21' has received the data receipt detection signal 622, it transmits device selection signal 619 to select the serial/parallel converter 611. Thus, the packet information administration apparatus 21' reads, from the internal register through the data bus 620, the synchronization maintenance request packet transmitted from the node 100'". Then, information in the packet about the address, the number of bytes to be transferred and the number of the node that issued the demand is stored in the portion of the microcontroller 621 that serves as the synchronization control information administration apparatus 24'.

The synchronization control information administration apparatus 24' synchronizes CPUs over the nodes in accordance with information supplied to the synchronization control information administration apparatus 24' by making packets that invalidate the synchronization flag as shown in FIG. 25 and writing the packets on the parallel/serial converter 627 in order to make invalid the reserve flag if the node has set the reserve flag with respect to data at address "01000000h". The written packets are converted into light signals by the light emitting device 628 so as to be distributed to all nodes through the star coupler 50.

Since the subsequent operations are the same as those according to the foregoing embodiments, their descriptions are omitted.

Figure 29A:
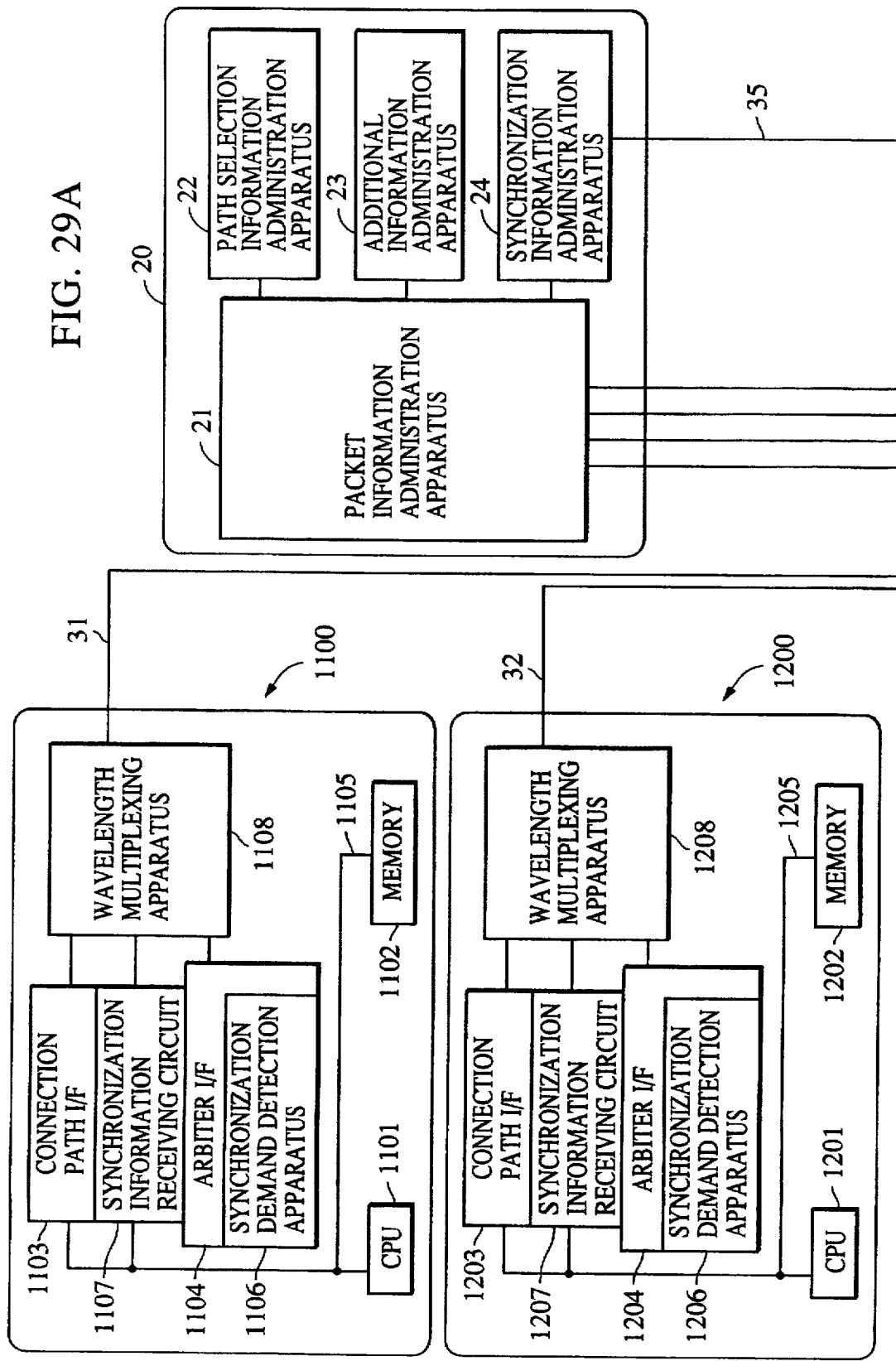
FIG. 29, consisting of FIGS. 29A and 29B, is a block diagram showing the structure of a network system according to this embodiment.
Figure 30:
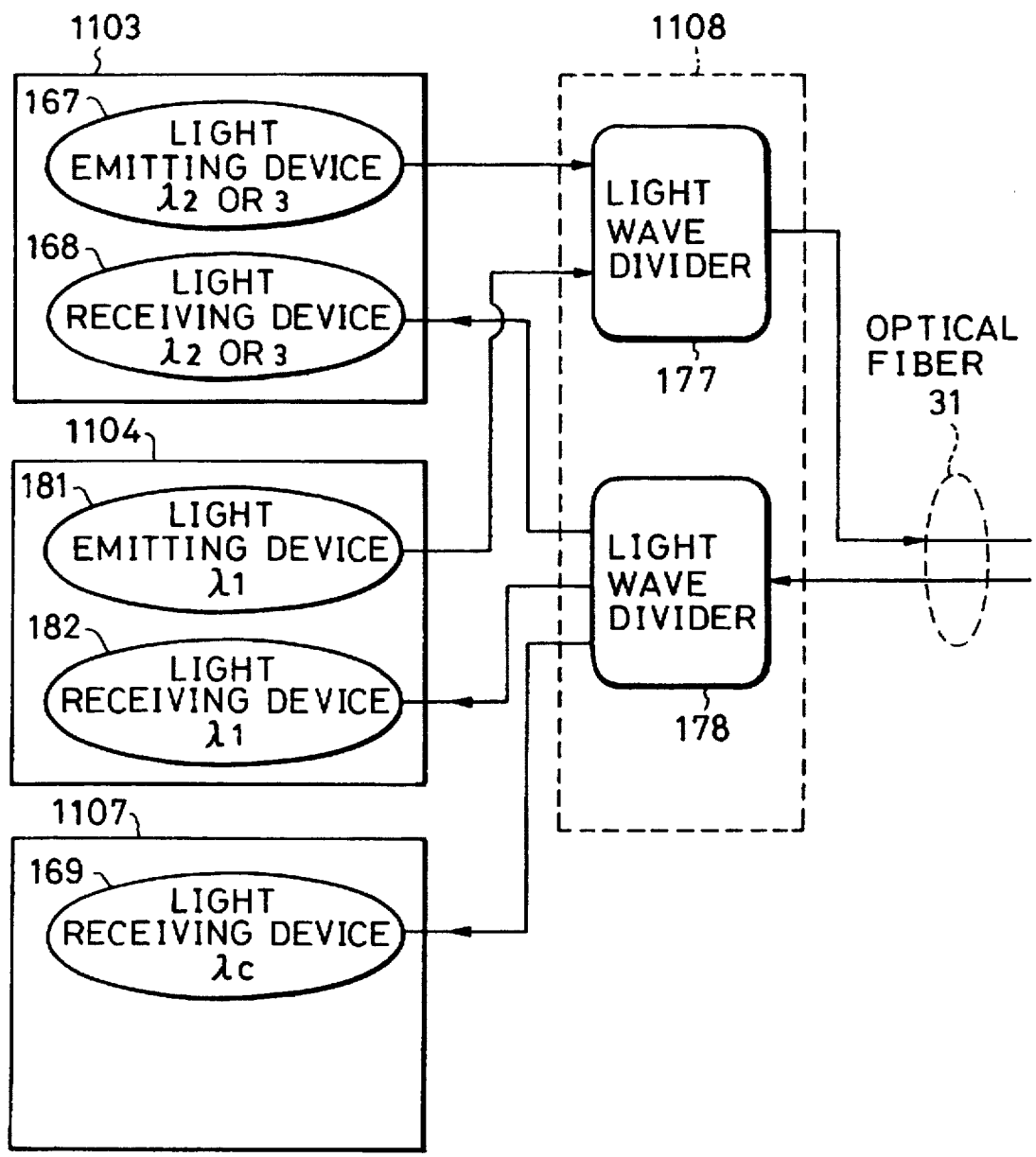
FIG. 30 is a block diagram showing the structure of a light wavelength multiplexing portion according to this embodiment.
Figure 31A:
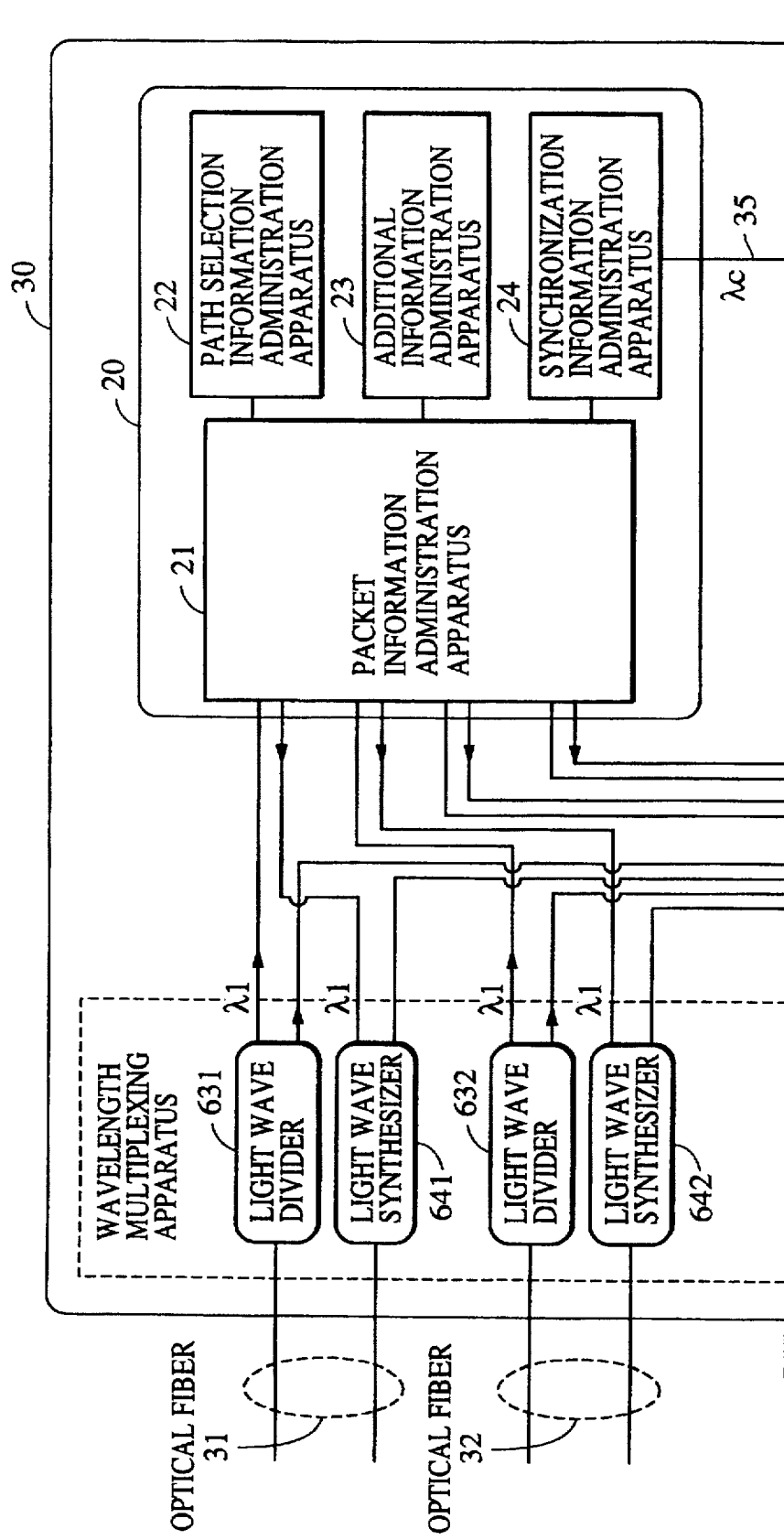
FIG. 31, consisting of FIGS. 31A and 31B, is a block diagram showing the structure of a light wavelength multiplexing portion of a concentrator according to this embodiment.

Although each of the foregoing embodiments has structure in which the arbitration signal paths 110 and 31, 210 and 32, 310 and 33 and 410 and 34 shown in FIG. 23 are physically independent paths, a structure physically passing through the same path may be employed if the foregoing lines can be logically separated. An example of the foregoing type is shown in FIGS. 29 to 31. Reference numerals of the same elements of the foregoing embodiments are used hereinafter.

FIG. 29 is a diagram showing the structure of a system according to this embodiment. As contrasted with the foregoing embodiment shown in FIG. 23, the arbiter interface circuits 1104, 1204, 1304 and 1404 are connected to the wavelength multiplexing apparatuses 1108, 1208, 1308 and 1408. Physical signal lines extending from the nodes are formed into optical fibers 31, 32, 33 and 34. The concentrator 30 and the arbiter 20 are located at the same position from a physical viewpoint. Thus, the number of the optical fibers introduced into the foregoing elements can be halved as compared with the structure shown in FIG. 23.

FIG. 30 is a diagram showing a state where the light signals are multiplexed in each node. Light having a wavelength λ1 transmitted from the arbiter interface 104 and light having a wavelength λ2 (or λ3) transmitted from the connection path interface 103 are synthesized by a two-wave synthesizer 177 of the wavelength multiplexing apparatus 108 so as to be transmitted to the node transmission side of the pair of optical fibers 31. On the other hand, the light signal transmitted to the node through the receiving line of the optical fiber 31 is divided into three wavelengths (λ1, λ2 (or λ3) and λc) of a three-wave divider 178 of the wavelength multiplexing apparatus 1108 so as to be supplied to each of the circuits (1103, 1104 and 1107).

In order to prevent radio interference at the time of multiplexing the wavelengths, the wavelengths λ1, λ2, λ3 and λc must be different from one another.

FIG. 31 is a diagram showing a state where light signals are multiplexed in the concentrator 30. The light signals connected to the arbiter 20 corresponding to the optical fibers 31, 32, 33 and 34 and the signals connected to the star coupler 50 are divided or synthesized by two-wave dividers 631, 632, 633 and 634 and the two-wave synthesizers 641, 642, 643 and 644.

As a result of the foregoing structure, a circuit capable of synchronizing CPUs can be formed in which the number of the physical signal lines for use in performing the light signal communication can be decreased.

The present invention may be adapted to a system comprising a plurality of apparatuses or just one apparatus. The present invention may be adapted to the case where a program for executing the present invention is supplied.

As described above, according to this embodiment, information supplied to the arbiter is distributed by using the star coupler or the like so that the CPUs are synchronized. Thus, CPUs in different nodes can quickly be synchronized and therefore an information processing apparatus having advanced performance can be realized.

As described above, according to the present invention, CPUs in different nodes can quickly be synchronized when the CPUs are intended to be synchronized.

As a result of the foregoing structure, information required to perform synchronized operation in a node or over nodes through transference paths, disposed individually from the connection path, is transmitted to the arbiter, and the arbiter redistributes a portion or the overall body of information to each node through the connection path. In accordance with the information thus again distributed, a portion or the overall body of information is reflected to the node.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. An information processing system connecting a plurality of information processing apparatuses through a network, each information processing apparatus including a processor, a memory and a bus for connecting the processor and the memory, wherein a memory space is composed of the memories of the plurality of information processing apparatuses, said information processing system comprising:

storage means for storing information for identifying which processor of the plurality of information processing apparatuses demands reading data when reading data is demanded from the memory space; and control means for applying an invalidation process to an address of the memory space when writing data is demanded to the address to which reading data is demanded, wherein when writing data is demanded to an address of the memory space to which reading data is demanded, said control means is adapted to transmit information for applying the invalidation process to the address to all the processors in the plurality of information processing apparatuses connected through the network.

2. An information processing system according to claim 1, wherein said storage means is arranged respectively in the plurality of information processing apparatuses.

3. An information processing system according to claim 1, wherein the network is a light-wave-multiplexed type network that establishes connection by using light having a plurality of wavelengths.

4. A method for connecting a plurality of information processing apparatuses through a network, each information processing apparatus including a processor, a memory and a bus for connecting the processor and the memory, wherein a memory space is composed of the memories of the plurality of information processing apparatuses, said method comprising the steps of:

storing information in a storage device for identifying which processor of the plurality of information processing apparatuses demands reading data when reading data is demanded from the memory space;

applying an invalidation process to an address of the memory space when writing data is demanded to the address to which reading data is demanded; and transmitting information for applying the invalidation process to the address to all the processors in the plurality of information processing apparatuses when writing data is demanded to an address of the memory space to which reading data is demanded.

5. A method according to claim 4, wherein the storage device is arranged respectively in the plurality of information processing apparatuses.

6. A method according to claim 4, wherein the network is light-wave-multiplexed type network that establishes connection by using light having a plurality of wavelengths.

7. An information processing system according to claim 1, wherein, when writing data is demanded to the address to which reading data is demanded, a specified processor, specified by the information in said storing means for identifying which processor of the plurality of information processing apparatuses demands reading data, allows the data to be written if the information has not been invalidated, and then the information in said storing means is invalidated.

8. A method according to claim 4, wherein, when writing data is demanded to the address to which reading data is demanded, a specified processor, specified by the information in the storage device for identifying which processor of the plurality of information processing apparatuses demands reading data, allows the data to be written if the information has not been invalidated, and then the information in the storage device is invalidated.

* * * * *

UNITED STATES PATENT AND TRADEMARK OFFICE
CERTIFICATE OF CORRECTION

PATENT NO. : 5,802,295
DATED : September 1, 1998
INVENTOR(S) : TOSHIYUKI FUKUI

It is certified that error appears in the above-identified patent and that said Letters Patent is hereby corrected as shown below:

COLUMN 14

Line 17, "tas an L" should read --that the--.

COLUMN 18

Line 1, "18341" should read --183"--.

COLUMN 28

Line 6, "is" should read --is a--.

Signed and Sealed this

Twenty-seventh Day of July, 1999

Attest:

Q. TODD DICKINSON

*Attesting Officer*     *Acting Commissioner of Patents and Trademarks*